US009216742B2

(12) United States Patent
Kuramori

(10) Patent No.: US 9,216,742 B2
(45) Date of Patent: Dec. 22, 2015

(54) VEHICLE EVALUATION METHOD AND VEHICLE EVALUATION APPARATUS

(75) Inventor: Akira Kuramori, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1073 days.

(21) Appl. No.: 12/768,867

(22) Filed: Apr. 28, 2010

(65) Prior Publication Data

US 2011/0112770 A1   May 12, 2011

(30) Foreign Application Priority Data

Apr. 28, 2009 (JP) .................... 2009-109328
Apr. 28, 2009 (JP) .................... 2009-109597

(51) Int. Cl.
*G01N 33/48* (2006.01)
*B60W 40/109* (2012.01)

(52) U.S. Cl.
CPC .................... *B60W 40/109* (2013.01)

(58) Field of Classification Search
CPC . B60W 40/109; A61B 5/0488; A61B 5/4884; A61B 5/18
USPC ................ 702/19; 600/546; 607/48
See application file for complete search history.

(56) References Cited

U.S. PATENT DOCUMENTS

| 2005/0082350 | A1* | 4/2005 | Tarui et al. | 228/248.1 |
| 2005/0090757 | A1* | 4/2005 | Kuramori et al. | 600/546 |
| 2008/0201038 | A1* | 8/2008 | Jung et al. | 701/41 |
| 2008/0294321 | A1* | 11/2008 | Yamakado et al. | 701/93 |
| 2010/0049278 | A1* | 2/2010 | Kuramori | 607/48 |
| 2010/0179764 | A1 | 7/2010 | Kuramori et al. | |

FOREIGN PATENT DOCUMENTS

| JP | 2002-214083 | 7/2002 |
| JP | 2002-225585 | 8/2002 |
| WO | WO 2008/032656 | 3/2008 |

OTHER PUBLICATIONS

Merriam-Webster online, "oscillate", accessed Oct. 21, 2013, www. merriam-webster.com/dictionary/oscillate.*
Young and Freedman, "University Physics", 2007, Pearson Addison Wesly, 12 edition, vol. 1, p. 421.*
Iwamoto et al., "Car Driver's Feelings Evaluated by Muscle Activity." Behavioral and Brain Sciences, Graduate School of Compreshensive Human Sciences, University of Tsukuba Vehicle, Testing & Research Department, Mazda Motor Corporation, 6 pages, date unknown.
Japanese Office Action, dated Jun. 11, 2013, 5 pages, Japan.
Akira Kuramori, Noritaka Koguchi, Masayoshi Kamijo, Tugutake Sadoyama, Yoshio Shimizu, Research on Evaluation Method of Vehicle Drivability Using EMG, Society of Automotive Engineers of Japan Annual Conference Proceedings, Oct. 27, 2004, 5 pages, No. 85-01, Japan.

* cited by examiner

*Primary Examiner* — Stephanie Bloss
(74) *Attorney, Agent, or Firm* — Thorpe North & Western

(57) ABSTRACT

The vehicle evaluation method and vehicle evaluation apparatus can appropriately and quantitatively evaluate the sense of lateral oscillation of a vehicle. The method and apparatus measure muscle activity waveforms of a pair of left and right muscles in at least one type of skeletal muscle involved in maintaining a posture of a head of an occupant of the vehicle driven under predetermined driving conditions, calculate an amount of simultaneous activity that expresses characteristics of the muscle activity waveforms and evaluate a sense of lateral oscillation of the vehicle based on the amount of simultaneous activity.

21 Claims, 12 Drawing Sheets

VEHICLE EVALUATION METHOD AND VEHICLE EVALUATION APPARATUS

PRIORITY CLAIM

This application is based upon and claims the benefit of priority from Japanese Patent Application No. 2009-109597, filed Apr. 28, 2009, and Japanese Patent Application No. 2009-109328, filed Apr. 28, 2009, the entire contents of both of which are incorporated herein by reference.

BACKGROUND OF THE INVENTION

The present invention relates to a vehicle evaluation method and vehicle evaluation apparatus for a sense of lateral oscillation of a vehicle which is one evaluation criterion of riding comfort, and particularly to a vehicle evaluation method and vehicle evaluation apparatus for appropriately evaluating the sense of lateral oscillation of a vehicle based on muscular activity involved in maintaining the posture of the head of a passenger, and to a vehicle evaluation method and vehicle evaluation apparatus for appropriately and quantitatively evaluating the sense of lateral oscillation of a vehicle while turning based on the muscular activity involved in maintaining the posture of the head of a passenger.

Currently, various criteria are evaluated concerning the riding comfort of an automobile (vehicle). One such criterion of riding comfort is the sense of lateral oscillation. "Sense of lateral oscillation" means the positive or negative feel of the head oscillating in a lateral direction accompanying a rolling motion or lateral motion of the vehicle caused by disturbances in road surfaces and the like during linear travel. "A state of preferable sense of lateral oscillation" generally refers to cases where the sense of swaying is small.

The sense of lateral oscillation is generated because of irregular road surfaces and occurs even though the vehicle is in a state of linear travel, and is particularly noticeable in vehicles with high centers of gravity such as minivans and SUVs (sports utility vehicles).

However, the sense of lateral oscillation is difficult to predict due to the complex effects of vehicle characteristics such as roll rigidity, roll attenuation factor, center of gravity height, wheel rate, and the like.

Currently, the relationship between rates of vehicle acceleration and acceleration increase, and electromyograms of left and right sternocleidomastoid muscles, which contribute to stabilizing the head, is a subject of analysis (see Yoshiteru IWAMOTO, Daisuke UMEZU, Shigeru OZAKI, "Evaluating the Sensations of Automobile Drivers by Electromyogram", 10th Conference of Japan Society of Kansei Engineering Preprint Collection, 2008; hereinafter referred to as Non-Patent Document 1). In Non-Patent Document 1, an approximation of the electromyograms of the sternocleidomastoid muscles is quantitatively calculated under the assumption that the electromyogram of the sternocleidomastoid muscles will be approximated by a linear sum of an acceleration rate (inertial force) and an acceleration increase rate.

Non-Patent Document 1 suggests that a change in the relationship between the acceleration rate and the acceleration increase rate in the forward and reverse directions of a vehicle and a calculated average waveform of activity of the left and right sternocleidomastoid muscles of the neck of the driver is possibly related to a sense of acceleration felt by the driver.

Furthermore, there are publications that focus on an amount of work being put upon the driver from an outside when turning a steering wheel due to irregular road surfaces and the like, and evaluate steering stability using a steering work rate which is a product of a steering force and a time derivative of a steering angle (i.e. steering speed) as an index (see JP 2002-214083A; hereinafter referred to as "Patent Document 1").

Patent Document 1, for instance, describes an evaluation of vehicle steering stability based on data from a myoelectric sensor that detects the myoelectric potential of the triceps, flexor carpi ulnaris, extensor carpi ulnaris and other muscles of the arm.

The evaluation in Patent Document 1 uses a negative steering work ratio (a ratio of negative steering work to positive steering work), and evaluates steering stability to be high when the negative steering work ratio is small.

Furthermore, Patent Document 1 also describes a relationship between the myoelectric potential and the negative steering work ratio (refer to FIG. 9). In FIG. 9 of Patent Document 1, an upper right region is a region of poor linear stability, and a lower left region is a region of favorable linear stability. Accordingly, a relationship between an evaluation of the steering stability and the effects on the driver (what body parts are subjected to what forces) can be determined by the content of FIG. 9.

SUMMARY OF THE INVENTION

As described above, the relationship between acceleration in the forward and reverse directions and the electromyogram of the sternocleidomastoid muscles which contribute to stabilizing the head is investigated in Non-Patent Document 1, but no investigations were made concerning the sense of lateral oscillation.

Furthermore, Patent Document 1 presents an evaluation of steering stability using the myoelectric potential, and shows the relationship between the steering stability evaluation and the effects on the driver, but does not in any way address the riding comfort of the driver.

As described above, the current situation is that there is no quantitative method for evaluating the sense of lateral oscillation. Therefore, the sense of lateral oscillation in a state of linear travel and the sense of lateral oscillation while turning are primarily evaluated by sensory evaluation.

However, sensory evaluations are greatly affected by personal differences of the evaluators (panelists), health conditions of the evaluators themselves, and various environmental conditions. Therefore, sensory evaluations of the sense of lateral oscillation while turning provide mixed results. Furthermore, sensory evaluations are beset by other problems, such as the many restrictions for testing procedures to which they are subjected.

A first object of the present invention is to eliminate the problems of the conventional technology, and to provide a vehicle evaluation method and vehicle evaluation apparatus that can appropriately and quantitatively evaluate the sense of lateral oscillation of a vehicle.

A second object of the present invention is to provide a vehicle evaluation method and vehicle evaluation apparatus that can appropriately and quantitatively evaluate the sense of lateral oscillation of the vehicle while turning.

In order to achieve the aforementioned objects, a first aspect of the present invention provides a vehicle evaluation method, including the steps of measuring muscle activity waveforms of a pair of left and right muscles of at least one type of skeletal muscle involved in maintaining posture of a head of an occupant of a vehicle being driven under predetermined driving conditions; calculating an amount of simultaneous activity that expresses characteristics of the muscle activity waveforms measured in the measuring step; and evaluating a sense of lateral oscillation of the vehicle based on the amount of simultaneous activity calculated in the calculating step.

In the first aspect of the present invention, the evaluation of the sense of lateral oscillation may be for a driver or a non-driver so long as the evaluation is for an occupant riding in the vehicle.

In the first aspect of the present invention, the calculating step preferably calculates the amount of simultaneous activity based on the muscle activity waveforms of the pair of left and right muscles involved in maintaining the posture of the head of the occupant.

Additionally, the first aspect of the present invention preferably further includes a first determination step, prior to the evaluation step, of determining whether or not the vehicle is in a state of substantially linear travel. It is preferable that the sense of lateral oscillation of the vehicle be evaluated via the evaluation step if the first determination step determines that the vehicle is in a state of substantially linear travel.

Furthermore, in the first aspect of the present invention, the first determination step preferably calculates a difference of trend components in the activity of the pair of left and right skeletal muscles, and determines the vehicle to be in the state of substantially linear travel if the difference falls within a predetermined range.

Furthermore, the first aspect of the present invention preferably further includes a second determination step, prior to the evaluation step, of determining whether or not a forward or reverse speed of the vehicle is substantially constant. It is preferable that the evaluating means evaluates the sense of lateral oscillation for the vehicle if the second determination step determines that the forward or reverse speed of the vehicle is substantially constant.

Furthermore, with the first aspect of the present invention, the at least one type of skeletal muscles preferably include at least one type of muscle selected from the group consisting of sternocleidomastoid muscles, upper trapezius muscles, temporal muscles, and splenius capitis muscles.

Furthermore, the first aspect of the present invention preferably further includes a selection step, prior to the measurement step, wherein the at least one type of skeletal muscle from a plurality of skeletal muscles involved in maintaining the posture of the head of the occupant is selected.

In this case, the at least one type of skeletal muscle selected in the selection step is preferably at least one type of muscle selected from the group consisting of sternocleidomastoid muscles, upper trapezius muscles, temporal muscles, and splenius capitis muscles.

In order to achieve the aforementioned object, a second aspect of the present invention provides a vehicle evaluation apparatus including muscle activity measuring means for measuring muscle activity waveforms of a pair of left and right muscles of at least one type of skeletal muscle involved in maintaining posture of a head of an occupant of a vehicle being driven under predetermined driving conditions; characteristic amount calculating means for calculating an amount of simultaneous activity that expresses characteristics of the muscle activity waveforms measured by the muscle activity measuring means; and an evaluating unit that evaluates a sense of lateral oscillation of the vehicle based on the amount of simultaneous activity calculated by the characteristic amount calculating means.

In this case, the at least one type of skeletal muscle is preferably at least one type of muscle selected from the group consisting of the sternocleidomastoid muscles, the upper trapezius muscles, the temporal muscles, and the splenius capitis muscles.

A third aspect of the present invention provides a vehicle riding comfort evaluation method including the steps of measuring a muscle activity waveform of a muscle on a side opposite to a turning direction in at least one type of skeletal muscle involved in maintaining posture of the head of an occupant in a vehicle while turning; calculating an amplitude characteristic value of a myoelectric potential that expresses characteristics of the muscle activity waveform measured in the measurement step; and evaluating a sense of lateral oscillation of a vehicle based on the amplitude characteristic value calculated in the calculation step.

In the third aspect of the present invention, the evaluation for the sense of lateral oscillation while turning may be for a driver or a non-driver so long as the evaluation is for an occupant riding in the vehicle.

The third aspect of the present invention preferably further includes a determination step, prior to the measurement step, of determining whether or not a traveling vehicle is turning and a turning direction; and a selection step of selecting the muscle on the side opposite to the turning direction determined in the determination step in the at least one type of skeletal muscle among a plurality of skeletal muscles involved in maintaining the posture of the head of the occupant of the vehicle if the determination step determines that a traveling state of the vehicle is a turning state and the turning direction is identified. The muscle activity waveform of the muscle selected in the selection step is preferably measured in the measurement step.

In the third aspect of the present invention, the determination step preferably calculates a difference between the amounts of muscle activity of the left and right muscles of the at least one type of skeletal muscle of which the muscle activity waveforms are measured, and determines whether or not the vehicle is turning and the turning direction based on the difference.

Furthermore, in the third aspect of the present invention, the at least one type of skeletal muscle preferably includes at least one type of muscle selected from the group consisting of sternocleidomastoid muscles, upper trapezius muscles, temporal muscles, and splenius capitis muscles.

Furthermore, the third aspect of the present invention preferably further includes a selection step, prior to the determination step, of selecting the at least one type of skeletal muscle from a plurality of skeletal muscles involved in maintaining the posture of the head of the occupant.

In this case, the at least one type of skeletal muscle selected in the selection step is preferably at least one type of muscle selected from the group consisting of sternocleidomastoid muscles, upper trapezius muscles, temporal muscles, and splenius capitis muscles.

A fourth aspect of the present invention provides a vehicle riding comfort evaluation apparatus including muscle activity measuring means for measuring a muscle activity waveform of a muscle on a side opposite to a turning direction in at least one type of skeletal muscle involved in maintaining posture of a head of an occupant in a vehicle while turning; characteristic amount calculating means for calculating an amplitude characteristic value of muscle activity that expresses characteristics of the muscle activity waveform of the muscle measured by the muscle activity measuring means; and an evaluating unit for evaluating a sense of lateral oscillation of the vehicle based on the amplitude characteristic value calculated by the characteristic amount calculating means.

The fourth aspect of the present invention preferably further includes determination means, prior to the measuring of the muscle activity waveform by the muscle activity measuring means, for determining whether or not a traveling vehicle is turning and a turning direction thereof; and selecting means for selecting the muscle on the side opposite to the turning direction determined by the determination means in the at least one type of skeletal muscle among a plurality of skeletal muscles involved in maintaining the posture of the head of the occupant of the vehicle if the determination means determines that the traveling vehicle is in a state of turning and the turning direction is identified. The muscle activity measuring means preferably measures the muscle activity waveform of the muscle selected by the selecting means.

In this case, the at least one type of skeletal muscle is preferably at least one type of muscle selected from the group consisting of sternocleidomastoid muscles, upper trapezius muscles, temporal muscles, and splenius capitis muscles.

Sensory evaluations of the sense of lateral oscillation are difficult to evaluate by a normal driver, and appropriate evaluations can only be made by a specialist such as a test driver.

However, in the present invention, because muscle activity such as muscle contraction of a pair of left and right muscles is measured when maintaining the posture of the head with regards to a lateral oscillation of a vehicle, and an amount of simultaneous activity is determined and used to evaluate the sense of lateral oscillation, any evaluator, whether a test driver or a normal driver, can appropriately and quantitatively evaluate the sense of lateral oscillation.

Furthermore, in the present invention, because the muscle activity in the muscle on the side opposite to the turning direction is measured for at least one type of skeletal muscle involved in maintaining posture of the head of an occupant while turning, and an amplitude characteristic value is calculated and used to evaluate the sense of lateral oscillation, any evaluator, whether a test driver or a normal driver, can appropriately and quantitatively evaluate the sense of lateral oscillation.

BRIEF DESCRIPTION OF THE DRAWINGS

FIG. 11A shows results for the turning angle; FIG. 11B shows results for the yaw rate; FIG. 11C shows results for a rate of lateral acceleration; FIG. 11D shows results for a rate of increase in lateral acceleration; FIG. 11E shows results for muscle activity of muscles on the side opposite of the turning direction; and FIG. 11F shows results for muscle activity of muscles on the same side as the turning direction.

DETAILED DESCRIPTION OF THE INVENTION

Herein below, a vehicle evaluation method and a vehicle evaluation apparatus according to the present invention are described in detail based on a preferred embodiment as shown in the accompanying drawings.

Figure 1:
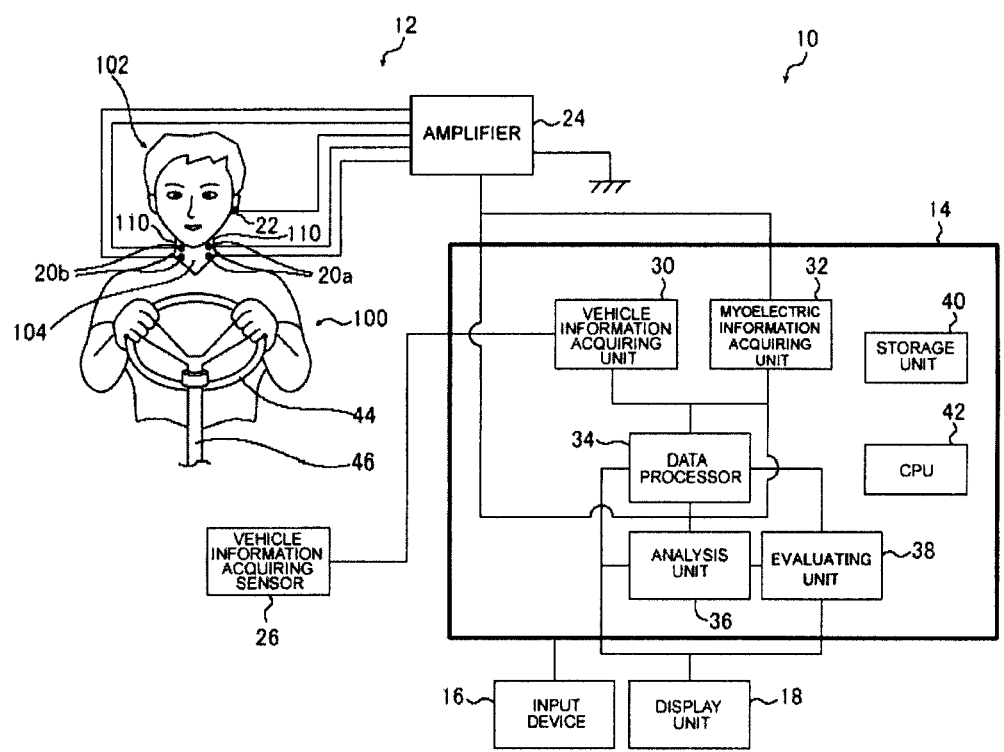
FIG. 1 is a schematic diagram showing a vehicle evaluation apparatus according to a first embodiment of the present invention.

FIG. 1 is a schematic diagram showing the vehicle evaluation apparatus according to a first embodiment of the present invention.

An evaluation apparatus 10 shown in FIG. 1 measures muscle activity (muscle activity waveforms) of a pair of left and right muscles of at least one type of skeletal muscle involved in maintaining posture of a head 102 of an occupant 100, calculates an amount of simultaneous activity that expresses characteristics of the muscle activity waveforms based on the muscle activity, and evaluates vehicle riding comfort in terms of a sense of lateral oscillation based on the amount of simultaneous activity. A "preferable sense of lateral oscillation" generally refers to cases where the sense of swaying is small.

"Occupant 100" includes a driver of the vehicle as well as non-drivers riding in passenger seats or the like. "Vehicle" includes passenger cars, buses, railway cars, and new transportation system vehicles.

Figure 2A:
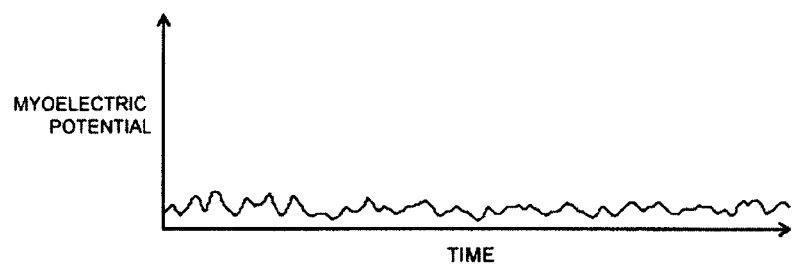
FIG. 2A is a graph showing an example of a signal waveform of skeletal muscle myoelectric potential when driving on a flat road. The myoelectric potential is shown on the vertical axis and time on the horizontal axis.
Figure 2B:
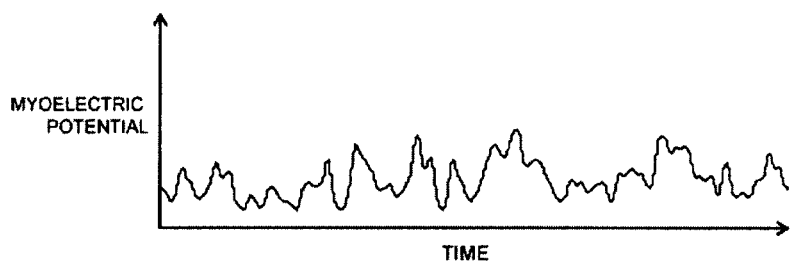
FIG. 2B is a graph showing an example of a signal waveform of skeletal muscle myoelectric potential when driving on an irregular road. The myoelectric potential is shown on the vertical axis and time on the horizontal axis.

For example, as shown in FIG. 2A, a width of an amplitude of a myoelectric potential is small when traveling linearly on a flat road. However, as shown in FIG. 2B, when traveling linearly on an irregular road, the amplitude of the myoelectric potential is larger despite the vehicle traveling linearly. In this manner, the skeletal muscles that maintain the posture of the head 102 of the occupant 100 are activated in order to suppress oscillation of the head. In other words, viscoelasticity around the neck is increased in order to suppress oscillation of the head. By quantifying a degree of the activation, an alternate characteristic value for the sense of lateral oscillation can be obtained.

With the evaluation apparatus 10 of the present embodiment, the sense of lateral oscillation can be appropriately and quantitatively evaluated using the fact that the greater the sense of lateral oscillation, the higher the amount of simultaneous activity that expresses the characteristics of muscle activity for a pair of left and right skeletal muscles that relate to maintaining the posture of the head 102 of the occupant 100.

The evaluation apparatus 10 contains a measuring unit (muscle activity measuring means) 12 and an evaluation unit 14. An input device 16 and a display unit 18 are connected to the evaluation unit 14.

Herein, the input device 16 is a keyboard, mouse, or the like that is used for input to a computer or the like.

The display unit 18 displays input information from the input device 16 and information obtained from the evaluation unit 14. The display unit 18 can be any type of monitor such as CRT, LCD, PDP, organic EL, and the like.

A measuring unit 12 contains a myoelectric sensor 20a, a myoelectric sensor 20b, a grounding electrode 22, and an amplifier 24, and also contains a vehicle information acquiring sensor (vehicle information acquiring means) 26.

The myoelectric sensor 20a and the myoelectric sensor 20b have a same construction, and therefore are described hereafter together as myoelectric sensors 20a, 20b.

The myoelectric sensors 20a, 20b detect the muscle activity (muscle activity waveforms) of a pair of left and right muscles from the skeletal muscles involved in maintaining the posture of the head 102 of the occupant 100 as the myoelectric potential.

The myoelectric sensors 20a, 20b are each constructed from, for example, a pair of Ag/AgCl plate-shaped electrodes. The pair of plate-shaped electrodes is attached to a surface of the skin at an interval of, for example, 5 mm at a location of the skeletal muscle to be measured.

The Ag/AgCl electrodes used in the myoelectric sensors 20a, 20b of the present embodiment are made by coating a surface of metallic silver with silver chloride, and are reusable standard electrodes with effective electrical characteristics.

However, the electrodes of the myoelectric sensors 20a, 20b are not limited to Ag/AgCl electrodes. The electrodes of the myoelectric sensors 20a, 20b may instead be constructed of other materials such as stainless steel, carbon, carbon composite, platinum, gold, silver, titanium, conductive resin, conductive polymeric gel, and the like.

The grounding electrode 22 is used to eliminate ambient noise as myoelectric potential signals received from the myoelectric sensors 20a, 20b are very weak. The grounding electrode 22 is connected to an amplifier 24 and is grounded through the amplifier 24.

The amplifier 24 amplifies by a predetermined ratio the myoelectric potential detected by the myoelectric sensors 20a, 20b, and performs AD (analog-to-digital) conversion. The amplifier 24 is connected to the myoelectric sensors 20a, 20b via a lead wire. The amplifier 24 for use in the present invention is commonly referred to as a bioelectric amplifier.

The amplifier 24 is connected to a myoelectric information acquiring unit 32, an analysis unit 36, and a storage unit 40 in the evaluation unit 14.

The myoelectric potential detected by the myoelectric sensors 20a, 20b is a minute voltage, usually between several microvolts and several millivolts.

Therefore, the voltage is amplified by the amplifier 24 approximately 1,000 times, for example, to a level that can be AD converted. Then, the amplified myoelectric potential signal is AD converted by the amplifier 24 using a predetermined sampling frequency, and output to the evaluation unit 14 as a digital signal.

The myoelectric sensors 20a, 20b are attached, for example, to the surface of the skin of the neck 102 at the location of left and right sternocleidomastoid muscles 110 of the occupant 100.

Figure 3A:
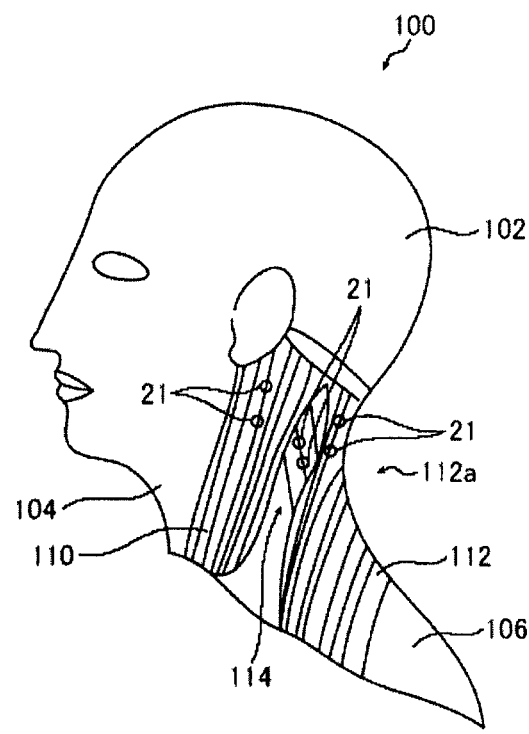
FIG. 3A and FIG. 3B are schematic diagrams showing examples of skeletal muscles whose muscle activity is to be measured and the mounting positions of myoelectric sensors on the skeletal muscle for the vehicle evaluation apparatus according to the first embodiment of the present invention.

In the present embodiment, the sternocleidomastoid muscles 110 to which the myoelectric sensors 20a, 20b are applied are muscles in the neck 104 of the occupant 100 as shown in FIG. 3A, and are symmetrically located on both sides of the neck 104. Movement of the sternocleidomastoid muscles 110 assists with overall movement of the head 102, including rotational movement of the head 102 and forward incline and backward incline movement of the head 102.

When the occupant 100 moves the head 102 forward and backward, the left and right sternocleidomastoid muscles 110 move synchronously. When the head 102 is turned, the sternocleidomastoid muscle 110 on a side that the head 102 is facing will work.

In FIG. 3A, only one side of the sternocleidomastoid muscles 110 are shown, but for the sternocleidomastoid muscles 110, the pair of electrodes of the myoelectric sensor 20a are attached to the surface of the skin of the neck 104 at locations shown by reference number 21, for example, parallel to the muscle fibers on muscle bellies of the sternocleidomastoid muscles 110 to be measured.

The pair of electrodes of the myoelectric sensor 20a is attached to the surface of the skin using an electrode glue, after first scrubbing to remove grime and wiping with alcohol or the like to minimize resistance between the skin and the electrode of the myoelectric sensor 20a. When applying the myoelectric sensor 20a, the electrical resistance between the skin and the electrode of the myoelectric sensor 20a is set to a state of 30 kΩ or less. Preferably, the electrical resistance when applying to the surface of the skin is set to a state of 5 kΩ or less.

The myoelectric sensor 20b that is to be attached to the remaining sternocleidomastoid muscle 110 on an opposite side is attached to the sternocleidomastoid muscle 110 by the same method as the myoelectric sensor 20a.

In the present embodiment, the skeletal muscles to be measured are not limited to the sternocleidomastoid muscles 110, and can be at least one type of skeletal muscle that relates to maintaining the posture of the head 102 of the occupant 100. For example, as shown in FIG. 3A, the trapezius muscles 112 that extend from the neck 104 of the occupant 100 to a back 106 are also acceptable. Only one side of the trapezius muscles 112 is shown in FIG. 3A, but these muscles are symmetric with regards to the spine (not shown in the figures).

The trapezius muscles 112 are large muscles and move differently in each region. Therefore, the muscle activity is measured in a region on a side of the neck 104 that relates to maintaining the posture of the head 102 of the occupant 100, specifically, an upper part 112a of the trapezius muscles 112. Therefore, for the trapezius muscles 112, the myoelectric sensors 20a, 20b are attached to a position 21 on the surface of the skin corresponding to the upper part 112a in a manner similar to when attaching to the sternocleidomastoid muscles 110.

The skeletal muscles to be measured may also be splenius capitis muscles 114 in the neck 104 as shown in FIG. 3A. Only one side of the splenius capitis muscles 114 are shown in FIG. 3A, but these muscles are symmetric with regards to the spine (not shown in the figures).

When the splenius capitis muscles 114 on one side move, the neck 104 turns in that direction, and when both sides move, the face points upward. For the splenius capitis muscles 114, the myoelectric sensors 20a, 20b are attached, for example, to a position 21 on the surface of the skin corresponding to the splenius capitis muscles 114 at a lower part of the back of the head, in a similar manner as to when attaching to the sternocleidomastoid muscles 110.

Figure 3B:
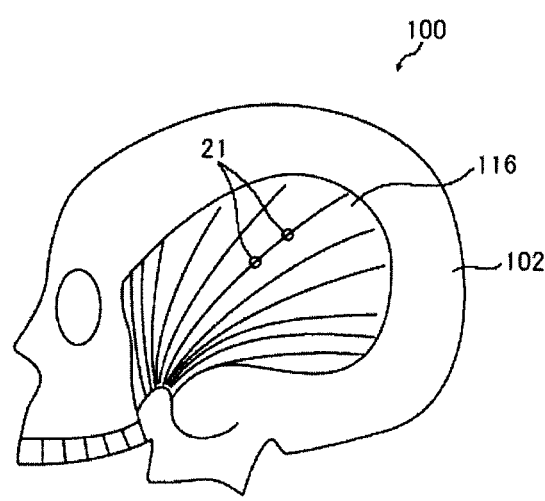

Again, the skeletal muscles to be measured may also be temporal muscles 116 on a side surface of the head 102 as shown in FIG. 3B. Only one side is shown in FIG. 3B, but the temporal muscles 116 are on both sides of the head 102.

In the case of the temporal muscles 116 as well, the myoelectric sensors 20a, 20b are attached to a position 21 on the surface of the skin corresponding to the temporal muscles 116 in a similar manner as to when attaching to the sternocleidomastoid muscles 110.

A vehicle information acquiring sensor 26 acquires information related to a traveling state of the vehicle such as linear traveling or turning in order to determine whether or not the vehicle is in a state of substantially linear travel. The vehicle information acquiring sensor 26 acquires, for example, a predetermined time, a vehicle lateral acceleration, a yaw rate, and a vehicle position information. In this case, the vehicle information acquiring sensor 26 can be for example an acceleration sensor, a rate gyroscope (angular velocity meter), or GPS.

Also, information related to the traveling state of the vehicle according to the vehicle information acquiring sensor 26 is not limited to vehicle lateral acceleration and yaw rate, and for example, roll angle or steering angle information can also be acquired in place of the lateral acceleration information. The roll angle can be measured, for example, using a gyroscopic sensor.

Furthermore, the steering angle can be measured by attaching a steering angle meter that uses a rotary encoder around a steering wheel shaft of the vehicle.

In the present embodiment, the construction of the vehicle information acquiring sensor 26 is not particularly limited, so long as a state of linear travel can be identified.

Furthermore, if a lateral acceleration sensor, GPS, or the like is provided in the vehicle, the lateral acceleration sensor, GPS, or the like can be connected to a vehicle information acquiring unit 30 via a CAN (Controller Area Network), and as the vehicle information acquiring unit 30 can be used to acquire lateral acceleration and GPS-based vehicle position information, the vehicle information acquiring sensor 26 is not necessarily required.

As shown in FIG. 1, the evaluation unit 14 contains the vehicle information acquiring unit 30, the myoelectric information acquiring unit 32, a data processor 34, the analysis unit (characteristic amount calculating means) 36, an evaluating unit 38, the storage unit 40, and a CPU 42.

The storage unit 40 stores the vehicle conditions, traveling conditions, and test subject information received from the input device 16 as described below, and also stores associations between the vehicle conditions, travel conditions, and test subject information, and the amount of simultaneous activity described below.

The CPU 42 controls the vehicle information acquiring unit 30, the myoelectric information acquiring unit 32, the data processor 34, the analysis unit 36, the evaluating unit 38, and the storage unit 40.

The evaluation unit 14 is a computer where each unit functions by means of the CPU 42 executing a sense of lateral oscillation evaluation method program stored in the storage unit 40. The evaluation unit 14 can also be a dedicated device where each unit is composed of dedicated circuitry.

The vehicle information acquiring unit 30 is connected to the vehicle information acquiring sensor 26. The vehicle information acquiring unit 30 is also connected to the data processor 34 and the storage unit 40. Also, the vehicle information acquiring unit 30 can be connected to other types of automotive sensors as well via the CAN.

An output signal from the vehicle information acquiring sensor 26, that includes, for example, the lateral acceleration information while traveling is input to the vehicle information acquiring unit 30 as information related to the traveling state of the vehicle.

The vehicle information acquiring unit 30 performs low pass filtering on, for example, the output signal of the lateral acceleration to obtain a smoothed signal waveform (smoothed waveform) that shows the lateral acceleration. The vehicle information acquiring unit 30 then outputs the data of the lateral acceleration signal waveform (smoothed waveform) to the data processor 34 and the storage unit 40.

The vehicle information acquiring unit 30 also performs low pass filtering on, for example, the output signal of the yaw rate to obtain a smoothed signal waveform (smoothed waveform) that shows the yaw rate. The vehicle information acquiring unit 30 can also output the data for the smoothed signal waveform of the yaw rate to the data processor 34 and the storage unit 40.

Also, the vehicle information acquiring unit 30 can also output the lateral acceleration output signal (signal waveform) and the yaw rate output signal (signal waveform) to the data processor 34 and the storage unit 40 without performing signal processing such as smoothing and the like.

In the present embodiment, in addition to lateral acceleration information, roll angle information, GPS-based vehicle position information, and steering angle information are input from the vehicle information acquiring sensor 26. Here as well, the vehicle information acquiring unit 30 acquires time series data for values of the roll angle, time series data for GPS-based vehicle position, and time series data for values of the steering angle based on the output signal from the vehicle information acquiring sensor 26, and then outputs these data to the data processor 34 and the storage unit 40.

The myoelectric information acquiring unit 32 is connected to the amplifier 24, the data processor 34, and the storage unit 40. The myoelectric potential of the sternocleidomastoid muscles 110 acquired as a time series by the myoelectric sensors 20a, 20b is A/D converted by the amplifier 24 to a digital signal. The myoelectric information acquiring unit 32 performs rectifying and smoothing of this digital signal to obtain smoothed waveform data for the myoelectric potential of the sternocleidomastoid muscles 110.

In the present embodiment, the digital signal output from the amplifier 24 is subjected to full-wave rectification. For example, rectifying and smoothing are performed by low pass filtering using a secondary Butterworth filter (cutoff frequency range is 1 to 10 Hz). Thereby, smoothed signal waveforms (also referred to below as "smoothed myoelectric waveforms") can be obtained for each of the myoelectric potentials of the left and right sternocleidomastoid muscles 110.

The myoelectric information acquiring unit 32 outputs the smoothed myoelectric waveform data to the data processor 34 and the storage unit 40.

The filter that is used for the low pass filtering in the myoelectric information acquiring unit 32 is not limited to a secondary Butterworth filter, and a tertiary or higher Butterworth filter can also be used. Moreover, when rectifying and smoothing, moving average filtering can also be used in place of low pass filtering.

The data processor 34 is connected to the analysis unit 36, the display unit 18, the storage unit 40, and the CPU 42.

The data processor 34 determines whether the vehicle is in a state of substantially linear travel from the signal waveforms of the myoelectric potential of the sternocleidomastoid muscles 110 or the signal waveform of the lateral acceleration measured.

In the case of the lateral acceleration, for example, a trend component between a direct current component (DC component or 0 Hz) and 0.5 Hz is determined from the lateral acceleration signal waveform data. If the trend component thus determined is smaller than a predetermined value, the vehicle will be determined to be in a state of substantially linear travel.

The trend component used in the determination of a state of substantially linear travel is preferably 0.25 Hz or less.

If the data processor 34 determines that the vehicle is in a state of substantially linear travel, a signal indicating a state of substantially linear travel (hereinafter simply referred to as "linear travel signal") is output to, for example, the CPU 42. After receiving the linear travel signal, the CPU 42 outputs a calculation signal to the analysis unit 36 to make the analysis unit 36 calculate the amount of simultaneous activity.

In the case of the yaw rate, the trend component of the signal waveform of the yaw rate is determined similarly to the lateral acceleration as described above. A value of the trend component is compared to a predetermined threshold value that has been set beforehand, and judgment is made as to whether or not the vehicle is in a state of substantially linear travel.

In the case of the steering angle value, the steering angle value is compared to a predetermined threshold value that has been set beforehand without determining the trend component, and judgment is made as to whether or not the vehicle is in a state of substantially linear travel.

In the case of the GPS-based vehicle position as well, a change over time in the GPS-based vehicle position is compared to a predetermined threshold value that has been set beforehand, and a judgment is made as to whether or not the vehicle is in a state of substantially linear travel.

Also, if the GPS-based vehicle position is used, the path of travel of the vehicle can be found, and the state of vehicle travel can be determined by performing pattern matching of the path of travel. In this case, a timing of vehicle position information acquisition will be associated with a timing of the myoelectric potential signal waveform.

If it is determined by the data processor 34 that the travel state of the vehicle is a state of substantially linear travel and the linear travel signal is output to the CPU 42, a calculation signal is output from the CPU 42 to the analysis unit 36, and the amount of simultaneous activity is calculated by the analysis unit 36 as described below.

There is no limitation that the traveling state of the vehicle must be determined while traveling, and that the amount of simultaneous activity must be calculated by the analysis unit 36 at this time. It is also possible to determine the amount of simultaneous activity during intervals when a state of linear travel was determined by the data processor 34 after traveling is completed.

Furthermore, when measuring the myoelectric potential, in addition to the vehicle being in a state of linear travel, speed thereof is preferably steady. In this case, an acceleration sensor that measures acceleration in the forward and reverse directions is provided as the vehicle information acquiring sensor 26. The acceleration in the forward and reverse directions of the traveling vehicle is measured by the acceleration sensor, and this acceleration value is acquired by the vehicle information acquiring unit 30 and output to the data processor 34. In the data processor 34, the value is compared to a preset threshold value for acceleration in the forward and reverse directions, and if the value is smaller than the threshold value, the speed is determined to be steady.

Also, with regards to the acceleration in the forward and reverse directions, if the vehicle is equipped with ABS for example, an acceleration output signal that is used for ABS can be used. In this case, the value for acceleration in the forward and reverse directions can be acquired by the vehicle information acquiring unit 30 via the CAN. Therefore, it is not always necessary to provide a forward and reverse direction acceleration sensor.

In the present embodiment, the traveling state of the vehicle is determined in the data processor 34 using vehicle information, but the present invention is not limited to this.

For example, whether or not the vehicle is in a state of substantially linear travel can also be determined using the measured myoelectric potential. In this case, trend components are determined for the smoothed myoelectric waveform data of the left and right sternocleidomastoid muscles 110, respectively.

Furthermore, the difference between the trend component of the left sternocleidomastoid muscle 110 and the trend component of the sternocleidomastoid muscle 110 is calculated. For this difference, a range that is considered to be a state of linear travel is set beforehand by testing or the like. Based on this difference, a determination is made as to whether or not the traveling state of the vehicle is a state of substantially linear travel.

The difference in the trend component determined from the smoothed myoelectric waveform data of the left and right myoelectric potentials is generated by a steady external force. Therefore, if this difference is sufficiently small, the vehicle can be considered to be in a state of substantially linear travel.

In this manner, the linear travel signal is output from the data processor 34 to the CPU 42 also when the vehicle is determined to be in a state of linear travel based on the signal waveforms of the myoelectric potential of the left and right sternocleidomastoid muscles 110. After receiving this linear travel signal, the CPU 42 outputs a calculation signal to the analysis unit 36.

Also, in the present embodiment, the amount of simultaneous activity can be calculated as described below using the myoelectric potential obtained by each of the myoelectric sensors 20a, 20b without acquiring the vehicle travel information if the travel condition is set to be a straight road.

Therefore, acquiring information on the traveling state of the vehicle is not absolutely necessary, and a determination of whether or not the vehicle is in a state of substantially linear travel by the data processor 34 is not necessarily required. In this case, the data processor 34 is not necessary, and the smoothed myoelectric waveform data of the left and right sternocleidomastoid muscles 110 is directly output from the myoelectric information acquiring unit 32 to the analysis unit 36.

The analysis unit 36 calculates the amount of simultaneous activity that expresses the characteristics of the muscle activity waveforms of the skeletal muscles that relate to maintaining the posture of the head 102 of the occupant 100, viz. the sternocleidomastoid muscles 110 in the present embodiment, and outputs the amount of simultaneous activity to the evaluating unit 38. The amount of simultaneous activity is calculated, for example, from the smoothed myoelectric waveform data obtained by the myoelectric information acquiring unit 32.

The amount of simultaneous activity of the present invention is a quantification of a state of activation of a pair of left and right muscles of at least one type of skeletal muscle involved in maintaining the posture of the head (the left and right sternocleidomastoid muscles in the present embodiment), specifically, a quantification of the degree of activation in a state of increasing viscoelasticity around the neck while the vehicle is in a state of substantially linear travel.

Figure 4A:
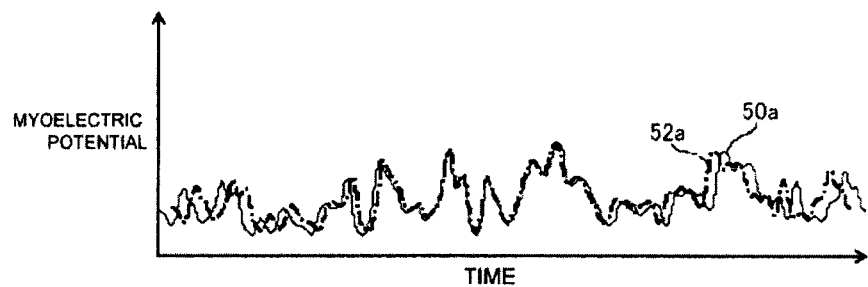
FIG. 4A is a graph showing an example of the signal waveforms of the myoelectric potential of left and right skeletal muscles. The myoelectric potential is shown on the vertical axis and time on the horizontal axis.

Therefore, the amount of simultaneous activity in general refers to the pair of left and right skeletal muscles being in a state of activation at substantially the same timing, as shown in FIG. 4A. Note, in FIG. 4A, reference number 50a represents the smoothed myoelectric potential waveform of the right muscle, and reference number 52a represents the smoothed myoelectric potential waveform of the left muscle.

Figure 4B:
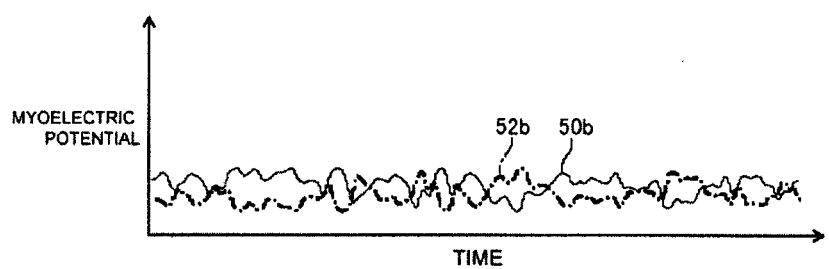
FIG. 4B is a graph showing another example of the signal waveforms of the myoelectric potential of left and right skeletal muscles. The myoelectric potential is shown on the vertical axis and time on the horizontal axis.

However, depending on vehicle characteristics and road conditions, even if the vehicle is moving in a state of substantially linear travel, it is possible that the left side muscle and the right side muscle of the pair of left and right skeletal muscles have alternating myoelectric potentials, specifically that the activation of the muscles occurs in alternation, as shown in FIG. 4B. In this case, the amount of simultaneous activity obtained by the following mathematical formulas based on the right side muscle myoelectric potential waveform 50b and the left side muscle myoelectric potential waveform 52b can be used as the amount of simultaneous activity of the present invention.

Figure 4C:
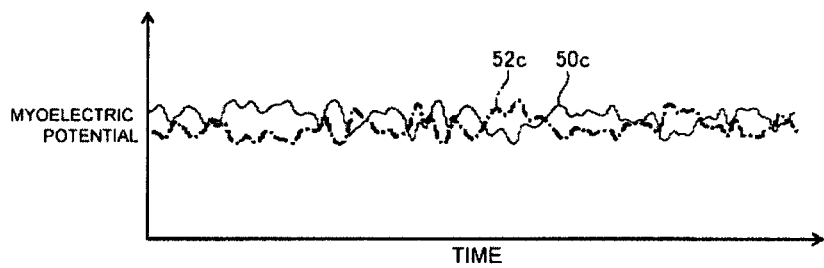
FIG. 4C is a graph showing yet another example of the signal waveforms of the myoelectric potential of left and right skeletal muscles. The myoelectric potential is shown on the vertical axis and time on the horizontal axis.

Furthermore, even if the vehicle is in a state of substantially linear travel, as shown in FIG. 4C, it is also possible that both the right side muscle and the left side muscle of the pair of left and right skeletal muscles have higher than usual myoelectric potential and furthermore that the myoelectric potential alternates between the right side muscle and the left side muscle, specifically, that the level of activation further changes in alternation while the muscles are in an activated state. In this case, the amount of simultaneous activity obtained by the following mathematical formulas based on the right side muscle myoelectric potential waveform 50c and the left side muscle myoelectric potential waveform 52c can be used as the amount of simultaneous activity of the present invention.

The analysis unit 36 calculates the amount of simultaneous activity as shown below, for example, using the left and right smoothed myoelectric waveform data.

In the analysis unit 36, an arithmetic mean value or an arithmetic mean root mean square(RMS)value of the left and right smoothed myoelectric waveform data is calculated, and the arithmetic mean value $V_1$ or the arithmetic mean RMS value $V_2$ is used as the amount of simultaneous activity.

The arithmetic mean value $V_1$ is obtained by the following mathematical formula 1, and the arithmetic mean RMS value $V_2$ is obtained by the following mathematical formula 2.

Herein, in the following mathematical formula 1 and mathematical formula 2, $e_{R1}$ represents the myoelectric potential of the right side smoothed myoelectric waveform data, and $e_{L1}$ represents the myoelectric potential of the left side smoothed myoelectric waveform data.

Also, the arithmetic mean value $V_1$ and the arithmetic mean RMS value $V_2$ are calculated using left and right smoothed myoelectric waveform data with lengths, for example, of 0.5 seconds or longer, preferably with lengths of approximately from 1 to 60 seconds, respectively.

$$V_1 = \frac{1}{N}\sum_{i=1}^{N}\frac{e_{R1i}+e_{L1i}}{2} \quad \text{[FORMULA 1]}$$

$$V_2 = \sqrt{\frac{1}{N}\sum_{i=1}^{N}\left(\frac{e_{R1i}+e_{L1i}}{2}\right)^2} \quad \text{[FORMULA 2]}$$

Geometric mean waveform data is obtained by combining the left and right smoothed myoelectric waveform data in the analysis unit 36, a an average value or a RMS value of the geometric mean waveform data is calculated. The geometric mean waveform data mean value $V_3$ or the geometric mean waveform data RMS value $V_4$ can be used as the amount of simultaneous activity.

The geometric mean waveform data average value $V_3$ is obtained by the following mathematical formula 3, and the geometric mean waveform data RMS value $V_4$ is obtained by the following mathematical formula 4.

Herein, $e_{R1}$ and $e_{L1}$ in the following mathematical formulas 3 and 4 are the same as in the mathematical formulas 1 and 2.

Also, the average value and RMS value of the geometric mean waveform data are determined using left and right smoothed myoelectric waveform data having lengths of 0.5 seconds or longer, and preferably data with lengths of approximately 1 to 60 seconds, respectively.

$$V_3 = \frac{1}{N}\sum_{i=1}^{N}\sqrt{e_{R1i}\cdot e_{L1i}} \quad \text{[FORMULA 3]}$$

$$V_4 = \sqrt{\frac{1}{N}\sum_{i=1}^{N}(e_{R1i} \cdot e_{L1i})} \quad \text{[FORMULA 4]}$$

Moreover, in the analysis unit 36, the amount of simultaneous activity can also be calculated by the myoelectric information acquiring unit 32 using the digital signals of the myoelectric potentials of the sternocleidomastoid muscles 110 that are analog to digital(A/D) converted by the amplifier 24; specifically, using the myoelectric potentials of the unrectified unsmoothed myoelectric potentials of the left and right sternocleidomastoid muscles 110. In this case, the RMS value per unit of time is calculated for both the left and right sides. Specifically, the right RMS value per unit time $RMS_{R1}$ and the left RMS value per unit time $RMS_{L1}$ are calculated.

Furthermore, an average value $V_5$ or geometric mean value $V_6$ of the left and right RMS values are calculated. The average value of the left and right RMS values $V_5$ or the geometric mean value of the left and right RMS values $V_6$ is used as the amount of simultaneous activity.

Specifically, the right RMS value $RMS_{R1}$ is calculated from the following mathematical formula 5, and the left RMS value $RMS_{L1}$ is calculated from the following mathematical formula 6.

The average value of the left and right RMS values $V_5$ is calculated by the following mathematical formula 7, and the geometric mean value of the left and right RMS values $V_6$ is calculated from the following mathematical formula 8.

Herein, in the following mathematical formulas 5 through 8, $E_{R1}$ is the myoelectric potential of the right side, and $E_{L1}$ is the myoelectric potential of the left side.

Note, the unit time for the RMS values has, for example, a length of 0.5 seconds or longer, and preferably has a length of approximately from 1 to 60 seconds.

$$RMS_{L1} = \sqrt{\frac{1}{N}\sum_{i=1}^{N} E_{L1_i}^2} \quad \text{[FORMULA 5]}$$

$$RMS_{R1} = \sqrt{\frac{1}{N}\sum_{i=1}^{N} E_{R1_i}^2} \quad \text{[FORMULA 6]}$$

$$V_5 = \frac{RMS_{L1} + RMS_{R1}}{2} \quad \text{[FORMULA 7]}$$

$$V_6 = \sqrt{RMS_{L1} \cdot RMS_{R1}} \quad \text{[FORMULA 8]}$$

In the present embodiment, any of the values $V_1$ through $V_6$ calculated by any of mathematical formulas 1 through 4 or mathematical formulas 7 or 8 can be used as the amount of simultaneous activity. The sense of lateral oscillation is evaluated using the amount of simultaneous activity.

The amount of simultaneous activity calculated in the analysis unit 36 is output to the evaluating unit 38. The amount of simultaneous activity calculated in the analysis unit 36 can also be stored in the storage unit 40.

Also, the analysis unit 36 is connected to the display unit 18, so that a value for the amount of simultaneous activity calculated by the analysis unit 36 can be displayed along with, for example, the waveform or waveforms of the myoelectric potential.

The evaluating unit 38 evaluates the sense of lateral oscillation using the amount of simultaneous activity calculated by the analysis unit 36. In the evaluating unit 38, a smaller value for the amount of simultaneous activity calculated by the analyzer 36 will be evaluated as a smaller sense of lateral oscillation. This is because as the amount of simultaneous activity increases, the swaying of the head 102 of the occupant 100 increases regardless of the vehicle being in a state of substantially linear travel.

Additionally, the evaluating unit 38 is connected to the display unit 18, and evaluation results using the amount of simultaneous activity calculated by the analysis unit 36 are displayed on the display unit 18.

Also, the storage unit 40 receives and stores the smoothed myoelectric waveform data obtained by the myoelectric information acquiring unit 32, the amount of simultaneous activity obtained by the analysis unit 36, and the evaluation result information obtained by the evaluating unit 38. The storage unit 40 can also store the digital signal of the myoelectric potential obtained in the conversion by the amplifier 24.

In the present embodiment, the measured myoelectric potential is preferably normalized beforehand by an external force in a lateral direction.

Normalization of the myoelectric potential uses, for example, the amount of muscle activity where the weight of the head itself is a load as a baseline value for the RVE (Reference Voluntary Electric Activity), determined by holding the head off the ground while in a lateral recumbent position (lying on one side). The myoelectric potential is normalized using this baseline value.

Additionally, an external force having a lateral direction of known size can be applied to the head and the myoelectric potential at the time of application measured. The size of the applied external force may then be used as the baseline value for normalization.

Furthermore, it is also possible to have the occupant tilt the head to any angle in the lateral direction, then measure the posture at that time (an angle of the head) using a sensor that can determine a position of the head, while simultaneously measuring the myoelectric potential to calculate the myoelectric potential and the force acting on the head in the lateral direction. Then, the myoelectric potential may be normalized using the force in the lateral direction as the baseline value.

If the myoelectric potential is normalized in such a manner, the traveling state of the vehicle, such as linear travel, turning, and the like, can be determined by measuring the myoelectric potential. Through this, the need to simultaneously measure vehicle movement when evaluating the sense of lateral oscillation is obviated, and the sense of lateral oscillation of the vehicle can be evaluated simply by measuring the myoelectric potential. Therefore, when evaluating the sense of lateral oscillation, measurements can be easily taken and the evaluation easily made.

Also, by normalizing the myoelectric potential, simply measuring the myoelectric potential of the occupant being evaluated is sufficient. Therefore, the vehicle information acquiring sensor 26 becomes unnecessary, and the sense of lateral oscillation for a plurality of vehicles can be evaluated by having the occupant ride in each vehicle.

Furthermore, when using the normalized myoelectric potential, normalization is preferably performed each time the electrodes that measure the myoelectric potential are attached.

Additionally, the myoelectric potential was used as the muscle activity information in the present embodiment, but the present invention is not limited to this condition. For example, the acceleration sensor can be placed on a muscle to measure muscle murmur. Muscle murmur is a type of pressure wave generated as a result of a diameter of the muscle fibers expanding and deforming sideways as they contract, and is a signal that reflects mechanical activity of a muscle. In the present embodiment, the sense of lateral oscillation can be evaluated using the muscle murmur in the same manner as when evaluated using the myoelectric potential.

Next, a method for evaluating the sense of lateral oscillation of a vehicle according to the present embodiment is described.

First, a driver is sat in a driver's seat of an automobile, and then an occupant 100 is sat in a front passenger seat, for example. The myoelectric sensors 20a, 20b are attached to a position on the surface of the skin corresponding to the left and right sternocleidomastoid muscles 110 of the occupant.

The myoelectric sensors 20a, 20b may also be attached to a position on the surface of the skin corresponding to the left and right sternocleidomastoid muscles 110 of the driver.

Next, the automobile is driven by the driver in, for example, a substantially straight line.

While the automobile is traveling in a straight line, the myoelectric potential of the occupant 100 is measured as described above using the myoelectric sensors 20a, 20b of the measuring unit 12.

In the evaluation unit 14, smoothed myoelectric waveforms are obtained for the left and right sternocleidomastoid muscles 110 being measuring by the myoelectric information acquiring unit 32. The smoothed myoelectric waveform data is output to the analysis unit 36.

At this time, vehicle information such as lateral acceleration or the like from the vehicle information acquiring unit 30 is unnecessary for determining whether or not the automobile is traveling in a substantially straight line.

Next, the amount of simultaneous activity is calculated in the analysis unit 36 from the myoelectric potential signal waveform data of the sternocleidomastoid muscles 110 using any one of the mathematical formulas 1 through 4. The amount of simultaneous activity thus calculated is output to the evaluating unit 38.

Next, the evaluating unit 38 makes an evaluation based on the amount of simultaneous activity. In this case, as described above, the lower the amount of simultaneous activity, the lower the evaluating unit 38 will evaluate the sense of lateral oscillation.

The evaluation results of the sense of lateral oscillation by the evaluating unit 38 may also be displayed on the display unit 18.

It is difficult for a normal driver to make a sensory evaluation of the sense of lateral oscillation. However, in the present embodiment, when the vehicle is in a state of substantially linear travel, the myoelectric potential of the left and right sternocleidomastoid muscles 110 is measured allowing the sense of lateral oscillation to be appropriately and quantitatively evaluated by any evaluator, whether a test driver or a normal driver, by using the myoelectric potential to calculate the amount of simultaneous activity. Therefore, the evaluator does not have to be a test driver or other specialist. Furthermore, as the evaluation is not a sensory evaluation, there are minimal restrictions on the test procedures, and evaluation variability is kept under control. In particular, normalizing the myoelectric potential allows for an even more precise evaluation.

Additionally, in the present embodiment, the vehicle was traveling in a straight line when evaluating the sense of lateral oscillation, but the present invention is not limited to this. For example, as described above, vehicle information such as the lateral acceleration is acquired by the vehicle information acquiring sensor 26, and a trend component from a direct current component (DC component or 0 Hz) to 0.5 Hz or less is calculated from the lateral acceleration signal waveform data. If the trend component thus calculated is smaller than a preset value, the data processor 34 determines the vehicle to be in a state of substantially linear travel, a linear travel signal is output to the CPU 42, a calculation signal is output from the CPU 42 to the analysis unit 36, and as described above, the amount of simultaneous activity is calculated and the sense of lateral oscillation is evaluated.

Furthermore, a difference (characteristic amount for traveling state) between a trend component of the left sternocleidomastoid muscle 110 and a trend component of the right sternocleidomastoid muscle 110 is calculated from the smoothed myoelectric waveform data of the myoelectric potential of the left and right sternocleidomastoid muscles 110 of the occupant 100. Then, the difference is used as a basis for determining whether or not the vehicle is in a state of substantially linear travel. If the vehicle is in a state of linear travel, a linear travel signal is output to the CPU 42, a calculation signal is output from the CPU 42 to the analysis unit 36, and the amount of simultaneous activity is calculated and the sense of lateral oscillation evaluated as described above.

In this case, it is not necessary to acquire vehicle information such as the lateral acceleration or the like from the vehicle information acquiring sensor 26. Note, the myoelectric potential of the occupant 100 is preferably normalized as described above.

Note, in the present embodiment, the evaluation method for the sense of lateral oscillation is not limited to the aforementioned evaluation method.

In the present embodiment, the sense of lateral oscillation can be evaluated by collecting data related to the sense of lateral oscillation for example, then comparing the amount of simultaneous activity for various conditions.

Figure 5:
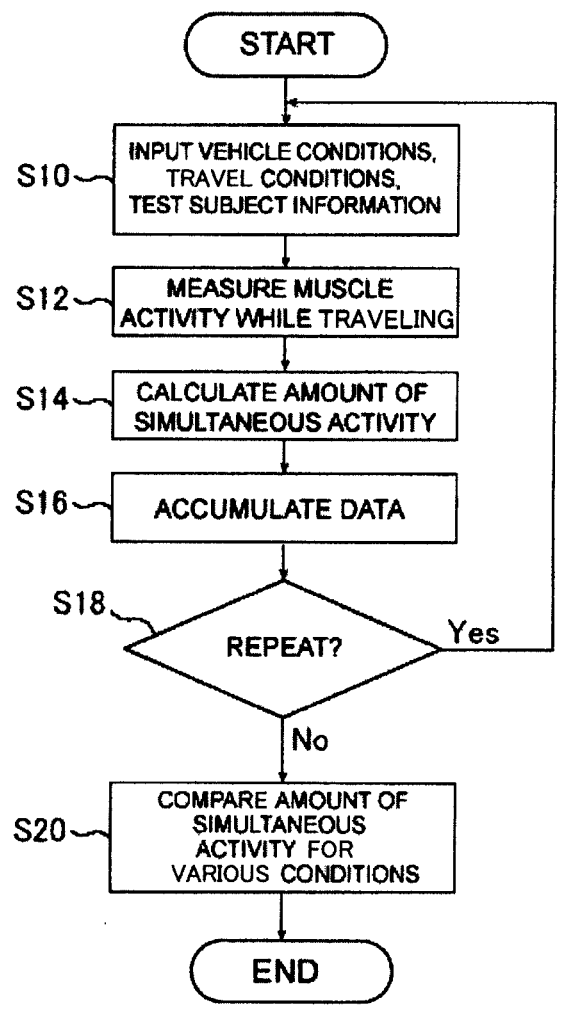
FIG. 5 is a flowchart of the evaluation method using the vehicle evaluation apparatus according to the first embodiment of the present invention.

In this case, using the evaluation apparatus 10, vehicle conditions, travel conditions, and test subject information are input by the input device 16 to the evaluation unit 14 (step S10) as shown in FIG. 5. The vehicle conditions, travel conditions, and test subject information (occupant information) are stored in the storage unit 40.

Examples of important categories of test subject information include a symbol, number, or name that can identify the individual test subject; an input date of the test subject information; test subject age; test subject gender; test subject height; and test subject weight.

Further examples of preferably input test subject information include test subject nationality, test subject address or region of residence, whether or not the test subject has prior experience riding in the type of vehicle being evaluated as well as the duration and frequency of that experience, whether or not the test subject has prior experience driving the type of vehicle being evaluated as well as the duration and frequency of that experience, and whether or not the test subject has prior experience evaluating and the duration of that experience.

Examples of vehicle conditions include vehicle make, model, displacement, years of use, distance traveled, tire type, tire pressure, and the like.

Examples of travel conditions include traveling areas such as urban areas, suburbs, highways, mountains, and the like, as well as road surface conditions such as dry, rain, and snow and the like.

Next, the vehicle is driven according to the travel conditions described above. At this time, the myoelectric sensors 20a, 20b are attached to the left and right sternocleidomastoid muscles 110 of the occupant 100 in order to measure muscle activity (step S12).

Next, as described above, any one of $V_1$ through $V_6$ is calculated as the amount of simultaneous activity using any one of mathematical formulas 1 through 4, 7, and 8, based on the measured muscle activity (step S14).

Next, the amount of simultaneous activity thus calculated is associated with the input vehicle conditions, travel conditions, and test subject information and stored as a set in the storage unit 40 (step S16).

Next, if enough data has been collected (step S18), the amount of simultaneous activity is compared for various conditions, and the sense of lateral oscillation is evaluated (step S20).

In this manner, the degree of the sense of lateral oscillation during each condition can be evaluated by comparing various conditions.

On the other hand, if not enough data has been collected (step S18), of the vehicle conditions, travel conditions, and test subject information, at least vehicle conditions or travel conditions are altered and the vehicle conditions, travel conditions, and test subject information are re-input into the evaluation unit 14 by the input device 16 (step S10).

The vehicle is then driven under the travel conditions described above, and the muscle activity at this time is measured (step S12).

Then, as described above, any one of $V_1$ through $V_6$ is calculated as the amount of simultaneous activity using any one of the aforementioned mathematical formulas 1 through 4, 7, and 8 based on the measured muscle activity (step S14).

Then, the amount of simultaneous activity thus calculated is associated with the input vehicle conditions, travel conditions, and test subject information and stored in the storage unit 40 (step S16). Steps S12 through S16 are repeated.

If enough data has been collected (step S18), the amount of simultaneous activity is compared for various conditions, and the sense of lateral oscillation is evaluated (step S20).

Regarding the decision whether the data collected in step S18 is sufficient or insufficient, if data for at least a plurality of vehicle conditions or travel conditions are collected for at least one test subject, data collection is deemed to be sufficient. Furthermore, if numerical targets for data collection such as number of test subjects, vehicle conditions, travel conditions, or the like are determined in advance, data collection is repeated until the targets are met (step S18), after which the amount of simultaneous activity is compared for various conditions and the sense of lateral oscillation is evaluated (step S20).

Next, a second embodiment of the present invention will be described.

Figure 6:
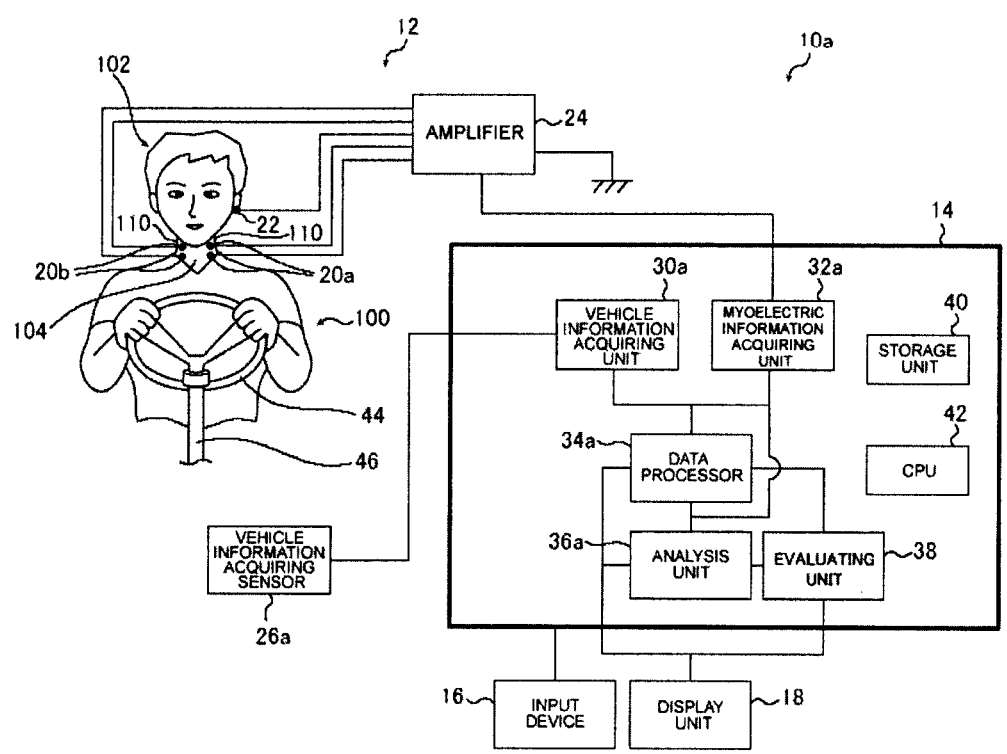
FIG. 6 is a schematic diagram showing the vehicle evaluation apparatus according to the second embodiment of the present invention.

FIG. 6 is a schematic diagram showing a vehicle evaluation apparatus according to the second embodiment of the present invention.

In the present embodiment, elements identical to those of the vehicle evaluation apparatus 10 according to the first embodiment shown in FIG. 1 are assigned identical numbers, and detailed descriptions thereof will be omitted.

An evaluation apparatus 10a shown in FIG. 6 measures muscle activity in a muscle on a side opposite to a turning direction, specifically a muscle to an outside of the turning direction for at least one type of skeletal muscle involved in maintaining the posture of a head 102 of an occupant 100; calculates an amplitude characteristic value (amount of amplitude characteristics) expressing the characteristics of a muscle activity waveform from the muscle activity of the muscle; and evaluates vehicle riding comfort in terms of a sense of lateral oscillation while turning based on the amplitude characteristic value. A "preferable sense of lateral oscillation" generally refers to cases where the sense of swaying is small.

Figure 7:
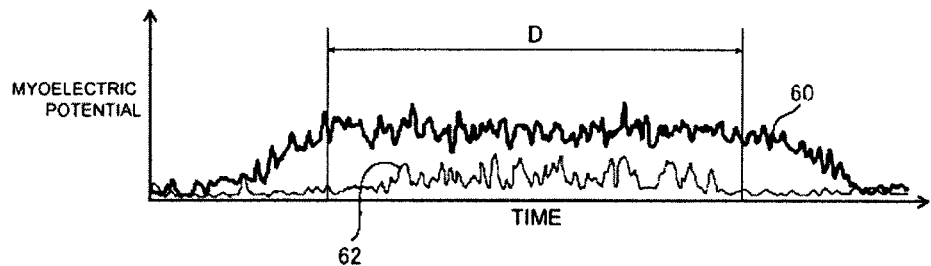
FIG. 7 is a graph showing an example of the signal waveform of the myoelectric potential of a skeletal muscle on the turning direction side during turning, and an example of the signal waveform of the myoelectric potential of a skeletal muscle on the side opposite the turning direction. The myoelectric potential is shown on the vertical axis and time on the horizontal axis.

For example, when the vehicle is turning, a time waveform 60 like that shown in FIG. 7 is obtained for the myoelectric potential of the sternocleidomastoid muscle on the same side as the turning direction. Likewise, a time waveform 62 is obtained for the myoelectric potential of the sternocleidomastoid muscle on the opposite side of the turning direction. The area labeled D in FIG. 7 represents the turning region.

The muscle to the outside of the turning direction is the antagonist muscle for maintaining posture while turning. In the region D where the vehicle is turning of FIG. 7, the degree of muscle activity in the muscle to the outside of the turning direction represented by the time waveform 60 is less than that in the muscle on the same side as the turning direction represented by the time waveform 62, i.e. the muscle activity on the opposite side of the turning direction is smaller.

However, for the muscle to the outside of the turning direction, the ratio of the muscle activity for suppressing lateral swaying of the head during turning is higher than for the muscle on the inside of the turning direction. Therefore the sense of lateral oscillation for a vehicle can be evaluated with the highest precision by selectively evaluating the muscle activity of the muscle to the outside of the turning direction.

With the evaluation apparatus 10a of the present embodiment, the sense of lateral oscillation can be appropriately and quantitatively evaluated using the fact that the greater the sense of lateral oscillation, the higher the amplitude characteristic value for the myoelectric potential expressing the characteristics of the muscle activity waveform for the muscle to the outside of the turning direction in the skeletal muscles involved in maintaining the posture of the head 102 of the occupant 100.

Except for the fact that an amplifier 24 is not connected to an analysis unit 36 and a storage unit 40 of an evaluation unit 14 but is connected to a myoelectric information acquiring unit 32; and the fact that a vehicle information acquiring sensor 26a, a vehicle information acquiring unit 30a, a myoelectric information acquiring unit 32a, a data processor 34a, and an analysis unit (calculating means) 36a are differently constructed, evaluation apparatus 10a possesses a construction identical to that of evaluation apparatus 10 of the first embodiment; therefore a detailed description thereof will be omitted.

The present embodiment uses myoelectric sensors 20a, 20b identical to those of the first embodiment. The method of attaching the myoelectric sensors 20a, 20b and the skeletal muscles being measured to which the myoelectric sensors 20a, 20b are attached are also the same as in the first embodiment; therefore a detailed description thereof will be omitted.

The evaluation unit 14 of the evaluation apparatus 10a shown in FIG. 6 has essentially the same construction as the evaluation unit 14 of the evaluation apparatus 10 of the first embodiment. The evaluation unit 14 contains a vehicle information acquiring unit 30a, a myoelectric information acquiring unit 32a, a data processor 34a, an analysis unit 36a, an evaluating unit 38, a storage unit 40, and a CPU 42.

Additionally, the storage unit 40 stores vehicle conditions, travel conditions, and test subject information (to be described below) input from an input device 16. The storage unit 40 also associates and stores the vehicle conditions, travel conditions, and test subject information, and an amplitude characteristic value to be described below.

In the evaluation apparatus 10a, the vehicle information acquiring sensor 26a differs from the vehicle information acquiring sensor 26 of the first embodiment in acquiring information related to the traveling state of the vehicle such as linear travel, turning, or the like in order to determine whether or not the vehicle is turning. Aside from this, however, the construction is the same as that of the vehicle information acquiring sensor 26 of the first embodiment. Therefore a detailed description thereof will be omitted.

The construction of the vehicle information acquiring sensor 26a is not particularly limited so long as the vehicle information acquiring sensor 26a can identify the traveling state of the vehicle such as turning, linear travel, and the like. The vehicle information acquiring sensor 26a can be, for example, an acceleration sensor, a rate gyroscope, an angular velocity meter, or a GPS. The information related to the traveling state of the vehicle obtained by the vehicle information acquiring sensor 26a can be vehicle lateral acceleration information, yaw rate information, and/or roll angle or steering angle information.

Furthermore, if a lateral acceleration sensor, yaw rate sensor, GPS, or the like is provided in the vehicle, the lateral acceleration sensor, yaw rate sensor, GPS or the like can be connected to the vehicle information acquiring unit 30a via a CAN, for example. As this vehicle information acquiring unit 30a can acquire information such as lateral acceleration, yaw rate, and GPS-based vehicle position information, the vehicle information acquiring sensor 26a is not necessarily required.

The vehicle information acquiring unit 30a has essentially the same construction and function as the vehicle information acquiring unit 30 of the first embodiment. The vehicle information acquiring unit 30a is connected to the vehicle information acquiring sensor 26a. Additionally, the vehicle information acquiring unit 30a is connected to the data processor 34a and the storage unit 40. The vehicle information acquiring unit 30a can also be connected to other types of automotive sensors via a CAN.

The output signal from the vehicle information acquiring sensor 26a that includes, for example, information on lateral acceleration during traveling is input as vehicle traveling state information into the vehicle information acquiring unit 30a.

The vehicle information acquiring unit 30a performs, for example, low pass filtering on the lateral acceleration output signal and the yaw rate output signal, in a manner similar to that of the vehicle information acquiring unit 30 of the first embodiment, to obtain a smoothed signal waveform (smoothed waveform) for each. The vehicle information acquiring unit 30a then outputs the lateral acceleration signal waveform (smoothed waveform) data and the smoothed data for the signal waveform of the yaw rate to the data processor 34a and the storage unit 40.

Furthermore, for a steering angle as well, low pass filtering for example is performed on the output signal from a steering angle meter to obtain a smoothed signal waveform (smoothed waveform) showing the steering angle. The vehicle information acquiring unit 30a can then also output the smoothed signal waveform data for the steering angle to the data processor 34a and the storage unit 40.

Note, the vehicle information acquiring unit 30a not only performs signal processing such as smoothing, but can also output the lateral acceleration output signal (signal waveform) and the yaw rate output signal (signal waveform) to the data processor 34a and the storage unit 40.

In the present embodiment, in addition to lateral acceleration information, roll angle information and GPS-based vehicle position information are input from the vehicle information acquiring sensor 26a. Here as well, the vehicle information acquiring unit 30a acquires roll angle value time series data and GPS-based vehicle position time series data based on the output signal from the vehicle information acquiring sensor 26a, then outputs these data to the data processor 34a and the storage unit 40.

The myoelectric information acquiring unit 32a is connected to the amplifier 24, the data processor 34a, and the storage unit 40. The myoelectric information acquiring unit 32a has the same construction as the myoelectric information acquiring unit 32 of the evaluation apparatus 10 of the first embodiment. Therefore a detailed description thereof will be omitted. In the present embodiment, the digital signal output from the amplifier 24 is subjected to full-wave rectification by the myoelectric information acquiring unit 32a, and, for example, rectifying and smoothing are performed by low pass filtering using a secondary Butterworth filter (cutoff frequency range is 1 to 10 Hz). Thereby, smoothed signal waveforms (also referred to below as smoothed myoelectric waveforms) can be obtained for each of the myoelectric potentials of the left and right sternocleidomastoid muscles 110.

Figure 8:
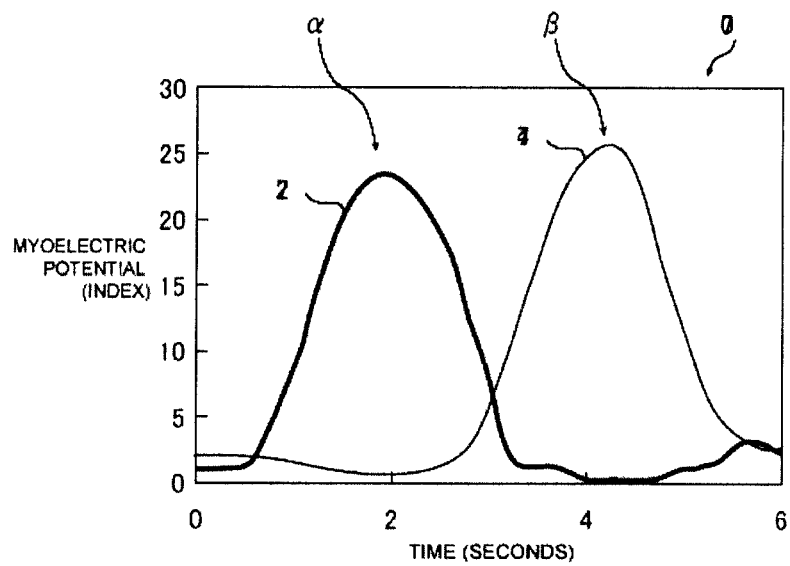
FIG. 8 is a graph showing the signal waveforms of the myoelectric potential of skeletal muscles during left and right turning. The myoelectric potential is shown on the vertical axis and time on the horizontal axis.

The myoelectric information acquiring unit 32a can obtain myoelectric potential signal waveforms (smoothed myoelectric waveforms) 72, 74 for the sternocleidomastoid muscles 110 when turning left or right, as shown in graph 70 of FIG. 8 for example. The myoelectric information acquiring unit 32a outputs the smoothed myoelectric waveform data to the data processor 34a and the storage unit 40.

As in the myoelectric information acquiring unit 32 of the first embodiment, a tertiary or higher Butterworth filter may be used as the filter for low pass filtering. Moreover, when rectifying and smoothing, a moving average filter can also be used in place of low pass filtering.

The signal waveform 72 is obtained by measuring the left side sternocleidomastoid muscle 110 of the occupant 100 for a predetermined period of time using the myoelectric sensor 20a then performing signal processing. The signal waveform 74 is obtained by measuring the right side sternocleidomastoid muscle 110 of the occupant 100 for a predetermined period of time using the myoelectric sensor 20b then performing signal processing.

The data processor 34a is connected to the vehicle information acquiring unit 30a, the myoelectric information acquiring unit 32a, the analysis unit 36a, the display unit 18, the storage unit 40, and the CPU 42.

The data processor 34a determines whether the vehicle is turning from the signal waveforms of the myoelectric potential of the sternocleidomastoid muscles 110 or from the signal waveform of the measured lateral acceleration, as well as the turning direction if the vehicle is turning. The data processor 34a determines whether or not the vehicle is turning and in what direction, then either outputs the smoothed myoelectric waveform data of the sternocleidomastoid muscle 110 on the side opposite to the turning direction to the analysis unit 36a; or causes the myoelectric information acquiring unit 32a to output the smoothed myoelectric waveform data of the sternocleidomastoid muscle 110 on the side opposite to the turning direction to the analysis unit 36a. In this manner, the data processor 34a constitutes both determination means and selection means.

In the case of lateral acceleration, a trend component between a direct current component (DC component or 0 Hz) and 0.1 Hz, for example, is calculated in the data processor 34a from the signal waveform indicating the lateral acceleration. If the trend component thus calculated is zero, the vehicle is determined to be traveling linearly. If the trend component for the lateral acceleration between the direct current component (DC component or 0 Hz) and 0.1 Hz has a positive value or a negative value, the vehicle is determined to be turning, and the turning direction is identified by the value of the trend component. The positivity/negativity of the lateral acceleration trend component is pre-associated with the left and right turning directions. For example, left turning is associated with a negative value for the trend component.

Likewise, for the yaw rate, the trend component between a direct current component (DC component or 0 Hz) and 0.1 Hz, for example, is calculated for a yaw rate signal waveform in a manner similar to that for the lateral acceleration as described above. If the calculated trend component is zero, the vehicle is determined to be traveling linearly. If the trend component between a direct current component (DC component or 0 Hz) and 0.1 Hz has a positive value or a negative value, the vehicle is determined to be turning, and the turning direction is identified by the value of the trend component. For the yaw rate as well, the positivity/negativity of the trend component is pre-associated with the left and right turning directions, as in the case of lateral acceleration.

In the case of the steering angle value, the steering angle value is compared to a predetermined threshold value that was set beforehand without determining the trend component, judgment is made as to whether or not the vehicle is turning, and the turning direction is identified by this steering angle value. The positivity/negativity of the steering angle is pre-associated with the left and right turning directions.

In the case of the GPS-based vehicle position as well, the change over time in the GPS-based vehicle position is compared to a predetermined threshold value that was determined beforehand, a judgment is made as to whether or not the vehicle is turning, and the turning direction is identified according to a direction of vehicle based on a change in the vehicle position over time. The direction of the vehicle based on the change in the vehicle position over time is pre-associated with the left and right turning directions.

Also, if the GPS-based vehicle position is used, it is acceptable to calculate the path of travel of the vehicle, determine the traveling state of the vehicle by means of pattern matching with the path of travel, and identify whether or not the vehicle is turning and if so in what direction. In this case, a timing of vehicle position information acquisition will be associated with a timing of the myoelectric potential signal waveform.

In the present embodiment, if the vehicle is determined to be turning by the data processor 34a based on the vehicle information and the turning direction identified, the sternocleidomastoid muscle 110 on the side opposite to the turning direction will be selected. The data processor 34a is then made to acquire only the myoelectric potential digital signal output from the amplifier 24 for the selected sternocleidomastoid muscle 110 by means of myoelectric information acquiring unit 32a. In this case, the smoothed myoelectric waveform data of the sternocleidomastoid muscle 110 on the side opposite to the turning direction obtained by the myoelectric information acquiring unit 32a is output directly to the analysis unit 36a.

In the analysis unit 36a to be described below, the amplitude characteristic value is calculated using the smoothed myoelectric waveform data of the sternocleidomastoid muscle 110 on the side opposite to the turning direction, for example.

Moreover, there is no limitation that the traveling state of the vehicle is to be determined while traveling and that the amplitude characteristic value be calculated by the analysis unit 36a at this time. After driving, the data processor 34a can determine during which periods the vehicle was turning and in what direction, and the amplitude characteristic value can be calculated using the smoothed myoelectric waveform data of the sternocleidomastoid muscle 110 on the side opposite to the turning direction for these periods.

The traveling state of the vehicle was determined in the data processor 34a using vehicle information, but the present invention is not limited to this condition. For example, whether or not the vehicle is turning and the turning direction can be determined using the measured myoelectric potential. In this case, the myoelectric potential is measured for the muscles on both sides for at least one type of skeletal muscle involved in maintaining the posture of the head. As shown in FIG. 7, a difference occurs between the myoelectric potential of the muscle on the inside of the turning direction and the myoelectric potential of the muscle on the outside of the turning direction due to the muscle activity of the muscle on the inside of the turning direction being relatively larger than that of the muscle on the outside of the turning direction. Whether or not the vehicle is turning and the turning direction can be determined by whether the difference is absent, specifically, the difference is 0, a positive value, or a negative value.

When determining the difference, the left myoelectric potential is always subtracted from the right myoelectric potential. Thereby, as shown in FIG. 8, for the myoelectric potential signal waveform 72 of the left side and the myoelectric potential signal waveform 74 of the right side of the sternocleidomastoid muscle 110 obtained by turning left and right, in the region a of left turning, the myoelectric potential signal waveform 72 of the left side is larger, resulting in the difference being a negative value; and in the region α of right turning, the myoelectric potential signal waveform 74 of the right side is larger, resulting in the difference being a positive value.

In addition to the method described above, the determination of whether or not the vehicle is turning and the turning direction based on the measured myoelectric potential can also be made in the following way. For example, the various trend components are calculated for the myoelectric potential signal waveforms 72, 74 of the measured left and right sternocleidomastoid muscles 110.

The difference between the trend component of the left sternocleidomastoid muscle 110 and the trend component of the right sternocleidomastoid muscle 110 is then calculated. Ranges of this difference corresponding to linear travel/turning and turning direction are established beforehand by testing or the like. Based on this difference, a determination is made as to whether or not the vehicle is turning, and the turning direction is also determined.

The difference in the trend component determined from the smoothed myoelectric waveform data of the left and right myoelectric potentials is generated by a steady external force. Therefore, if this difference is sufficiently small, the vehicle can be considered to be in a state of substantially linear travel.

In this manner, if the vehicle is determined to be turning and the turning direction is identified by the data processor 34a based on the myoelectric potential signal waveforms of the left and right sternocleidomastoid muscles 110, the smoothed myoelectric waveform data of sternocleidomastoid muscle 110 on the side opposite to the turning direction is output from the data processor 34a to the analysis unit 36a.

Furthermore, in the present embodiment, if the traveling state of the vehicle is determined to be turning by the data processor 34a using the measured myoelectric potential and the turning direction is identified, the sternocleidomastoid muscle 110 on the side opposite to the turning direction can be selected and the data processor 34a made to acquire only the myoelectric potential digital signal output from the amplifier 24 for the selected sternocleidomastoid muscle 110 by means of the myoelectric information acquiring unit 32a. In this case, the smoothed myoelectric waveform data of the sternocleidomastoid muscle 110 on the side opposite to the turning direction obtained by the myoelectric information acquiring unit 32a is output directly to the analysis unit 36a. In the analysis unit 36a, as described below, the amplitude characteristic value is calculated using the smoothed myoelectric waveform data of the sternocleidomastoid muscle 110 on the side opposite to the turning direction, for example.

Also, in the present embodiment, by storing a relationship between the myoelectric sensors 20a, 20b and the turning direction in advance in the storage unit 40 and determining the turning direction, the amplitude characteristic value (described below) can be calculated using the myoelectric potential obtained by either of the myoelectric sensors 20a, 20b on the side opposite to the turning direction while turning, without acquiring turning information.

Therefore, it is not absolutely necessary to acquire the turning information, or to determine whether the vehicle is turning and the turning direction by the data processor 34b. In this case, the data processor 34a is not necessary and the smoothed myoelectric waveform data of the sternocleidomastoid muscle 110 on either the left or right side that is to the outside of the turning direction is directly output from the myoelectric information acquiring unit 32a to the analysis unit 36a.

Furthermore, if the turning direction is determined beforehand, the skeletal muscle subject to measuring is restricted to the skeletal muscle on the side opposite to the turning direction. Therefore, for the skeletal muscle to be measured (in the case of the present embodiment, the right and left sternocleidomastoid muscles 110) only the side opposite to the turning direction need be selected. In the present embodiment, the myoelectric potential of the sensor 20a is used when turning right, and the myoelectric potential of the sensor 20b is used when turning left.

In the present embodiment as well, the measured myoelectric potential is preferably normalized beforehand by an external force in the lateral direction in the same manner as the first embodiment.

Also, by normalizing the myoelectric potential, it is sufficient to only measure the myoelectric potential of the occupant being evaluated. Therefore the vehicle information acquiring sensor 26a becomes unnecessary, and the sense of lateral oscillation during turning for a plurality of vehicles can be evaluated by having the occupant ride in each vehicle.

In addition, when using normalized myoelectric potential, normalizing is preferably performed each time the electrodes that measure the myoelectric potential are attached.

The analysis unit 36a calculates the amplitude characteristic value using, for example, the smoothed myoelectric waveform data of the sternocleidomastoid muscle 110 on the side opposite to the turning direction.

The amplitude characteristic value of the present invention quantifies an amplitude and a change in amplitude of the myoelectric potential of those skeletal muscles involved in maintaining the posture of the head to the outside of the turning direction for which a large ratio of muscle activity is devoted to suppressing lateral swaying of the head while turning (in the present embodiment, the sternocleidomastoid muscle).

For the amplitude characteristic value, a value representing the amplitude can be used, such as, for example, an average value of the myoelectric potential across a predetermined range of the smoothed myoelectric waveform data for the sternocleidomastoid muscle 110 on the outside of the turning direction, or a RMS value of the myoelectric potential across a predetermined range.

Furthermore, for the amplitude characteristic value, a value representing the change in amplitude can be used, such as, for example, a standard deviation for a predetermined range of the smoothed myoelectric waveform data for the sternocleidomastoid muscle 110 on the outside of the turning direction. If turning occurs within the predetermined range, the change in the amplitude can be expressed by this standard deviation.

Furthermore, the value expressing the change in amplitude is not limited to the standard deviation, and a CV value may also be used. The CV value is defined as the standard deviation/average value. With the CV value, the size of the change in amplitude is normalized by the size of the amplitude, thus minimizing individual differences and variations in measurement.

It is also acceptable to find a derivative of the smoothed myoelectric waveform data over time across a predetermined range, calculate the amplitude (RMS value) of the derivative of the smoothed myoelectric waveform data across the predetermined range, and use this amplitude to express the change in amplitude.

Also, as the analysis unit 36a is connected to the display unit 18, the value for the amplitude characteristic value calculated by the analysis unit 36a can be displayed together with, for example, the waveform or waveforms of the myoelectric potential.

The evaluating unit 38 evaluates the sense of lateral oscillation using the amplitude characteristic value calculated by the analysis unit 36a. In the evaluating unit 38, the smaller the amplitude characteristic value calculated by the analysis unit 36a, the smaller the sense of lateral oscillation will be evaluated. This is because a large amplitude characteristic value indicates a greater amount of swaying in the head 102 of the occupant 100 in a turning vehicle.

The evaluating unit 38 is also connected to the display unit 18, and the evaluation results using the amplitude characteristic value calculated by the analysis unit 36a are displayed on the display unit 18.

In addition, the smoothed myoelectric waveform data obtained by the myoelectric information acquiring unit 32a, the amplitude characteristic value obtained by the analysis unit 36a, and the evaluation results information obtained by the evaluating unit 38 are each input into and stored within the storage unit 40.

In the present embodiment, as in the first embodiment, muscle activity information other that myoelectric potential, such as muscle murmur, can be used. In this case as well, the sense of lateral oscillation can be evaluated in a similar manner to when the myoelectric potential is used.

Next, a method for evaluating the sense of lateral oscillation of a vehicle according to the present embodiment is described.

First, a driver is sat in the driver's seat of an automobile, and then an occupant 100 is sat, for example, in a front passenger seat. The myoelectric sensors 20a, 20b are attached to positions on the surface of the skin corresponding to the left and right sternocleidomastoid muscles 110 of the occupant.

The myoelectric sensors 20a, 20b may also be attached to positions on the surface of the skin corresponding to the left and right sternocleidomastoid muscles 110 of the driver.

Next, the automobile is driven by the driver so as, for example, to make left and right turns. While the automobile is traveling, the myoelectric potential of the occupant 100 is measured as described above using the myoelectric sensors 20a, 20b of the measuring unit 12 in the same manner as in the first embodiment.

In the evaluation unit 14, the smoothed myoelectric waveform data is obtained for the measured left and right sternocleidomastoid muscles 110 by the myoelectric information acquiring unit 32a. The smoothed myoelectric waveform data is output to the analysis unit 36a.

At this time, the vehicle information such as the lateral acceleration or the like from the vehicle information acquiring unit 30a is acquired in order to determine whether or not the automobile is turning.

For example, the vehicle information such as the lateral acceleration is acquired by the vehicle information acquiring sensor 26a, and a trend component of 0.1 Hz or lower, for example, is calculated from the signal waveform data of the lateral acceleration.

Furthermore, the data processor 34a determines whether the vehicle is turning and the turning direction based on whether the trend component is a positive value or a negative value or the like. Based on this determination, if the vehicle is turning, the smoothed myoelectric waveform data for the sternocleidomastoid muscle 110 on the side opposite to the turning direction is output to the analysis unit 36a. In this manner, data for the smoothed myoelectric waveform of the left or right sternocleidomastoid muscle 110 on the side opposite to the turning direction is selected by the data processor 34a and output to the analysis unit 36a. Afterwards, the amplitude characteristic value is calculated by the analysis unit 36a. The amplitude characteristic value is then output to the evaluating unit 38.

Next, the evaluating unit 38 makes an evaluation based on the amplitude characteristic value. In this case, as described above, the lower the amplitude characteristic value, the lower the evaluating unit 38 will evaluate the sense of lateral oscillation. The evaluation results of the sense of lateral oscillation given by the evaluating unit 38 may be displayed on the display unit 18.

It is difficult for a normal driver to make sensory evaluations of the sense of lateral oscillation. However, in the present embodiment, the sense of lateral oscillation while turning can be appropriately and quantitatively evaluated by any evaluator, whether a test driver or a standard driver, by calculating the amplitude characteristic value based on the myoelectric potential while turning of the muscle on the side opposite to the turning direction. Therefore, the evaluator does not have to be a test driver or other specialist. Furthermore, as the evaluation is not a sensory evaluation, there are minimal restrictions on the test procedures, and evaluation variability is kept under control. In particular, normalizing the myoelectric potential allows for an even more precise evaluation.

In addition, in the present embodiment, an arrangement is also acceptable in which the sense of lateral oscillation is evaluated by the evaluating unit 38 without gathering vehicle information by calculating the difference of the smoothed myoelectric waveform data of the myoelectric potential for the left and right sternocleidomastoid muscles 110 of the occupant 100, then using this difference to determine whether or not the vehicle is turning and the turning direction. If the vehicle is determined to be turning, the smoothed myoelectric waveform data of the sternocleidomastoid muscle 110 on the side opposite to the turning direction is output from the data processor 34a to the analysis unit 36a, and the amplitude characteristic value is calculated by the analysis unit 36a as described above.

In this case, it is not necessary to acquire the vehicle information such as the lateral acceleration or the like from the vehicle information acquiring sensor 26a. Note, the myoelectric potential of the occupant 100 is preferably normalized as described above.

In the present embodiment, no restrictions were placed upon the travel conditions when evaluating the sense of lateral oscillation, but the present invention is not limited to this. For example, an arrangement is acceptable wherein right is designated as the turning direction, one myoelectric sensor 20a is attached at a position on the surface of the skin corresponding to the sternocleidomastoid muscle of the left side (i.e. the side opposite to the turning direction), and then the myoelectric potential while the automobile is turning is measured. The amplitude characteristic value is calculated and the sense of lateral oscillation can be evaluated by the evaluating unit 38 as described above.

In this manner, designating a specific turning direction means that only one myoelectric sensor 20a is required, allowing the sense of lateral oscillation to be easily evaluated using a simple configuration.

Additionally, in the present embodiment, the evaluation method for the sense of lateral oscillation is not restricted to the evaluation method described above.

In the present embodiment, as in the first embodiment, the sense of lateral oscillation while turning can be evaluated by, for example, collecting data related to the sense of lateral oscillation, then comparing the amplitude characteristic values for various conditions.

In this case, using the evaluation apparatus 10a, vehicle conditions, travel conditions, and test subject information are input by an input device 16 to the evaluation unit 14 (step S10) as shown in FIG. 5, in the same manner as in the first embodiment. The vehicle conditions, travel conditions, and test subject information (occupant information) are stored in the storage unit 40.

As the vehicle conditions, travel conditions, and test subject information input in step S10 are the same as in the first embodiment, a detailed description thereof will be omitted.

Next, the vehicle is driven based on the travel conditions described above. At this time, the myoelectric sensors 20a, 20b are attached to the left and right sternocleidomastoid muscles 110 of the occupant 100 in order to measure muscle activity (step S12).

Next, the measured muscle activity is used to determine whether or not the vehicle is turning and the turning direction as described above. Based on these results, for example, the amplitude characteristic value is calculated based on the smoothed myoelectric waveform data of the sternocleidomastoid muscle 110 on the outside of the turning direction (step S14).

Next, the calculated amplitude characteristic value is associated with the vehicle conditions, the travel conditions, and the test subject information and stored as a set in the storage unit 40 (step S16).

Next, if enough data has been collected (step S18), the amplitude characteristic value is compared for various conditions, and the sense of lateral oscillation is evaluated (step S20).

In this manner, the degree of the sense of lateral oscillation for each condition can be evaluated by comparing various conditions.

On the other hand, if not enough data has been collected (step S18), of the vehicle conditions, the travel conditions, and the test subject information, at least the vehicle conditions or the travel conditions are altered and the vehicle conditions, the travel conditions, and the test subject information are re-input into the evaluation unit 14 by the input device 16 (step S10).

The vehicle is then driven under the travel conditions described above, and muscle activity at this time is measured (step S12).

Then, the measured muscle activity is used to determine whether or not the vehicle is turning and the turning direction as described above. Based in these results, for example, the amplitude characteristic value is calculated based on the smoothed myoelectric waveform data of the sternocleidomastoid muscle 110 on the outside of the turning direction (step S14).

Then, the calculated amplitude characteristic value is associated with the vehicle conditions, the travel conditions, and the test subject information and stored in the storage unit 40 (step S16). Steps S12 through S16 are repeated.

If enough data has been collected (step S18), the amplitude characteristic value is compared for various conditions and the sense of lateral oscillation is evaluated (step S20).

As the decision on whether enough data was gathered in step S18 or not as well as decision regarding the amount of data to be collected are made in the same manner as in the first embodiment, a detailed description of the process will be omitted. In the present embodiment as well, data is first collected (step S18), after which the amplitude characteristic value is compared for various conditions in order to evaluate the sense of lateral oscillation (step S20).

Both the first and the second embodiments evaluate the sense of lateral oscillation, but the following evaluations can be further made based on the evaluation of the sense of lateral oscillation.

For example, riding comfort as affected by changes in the vehicle itself can be evaluated. In this case, the riding comfort for the same vehicle as affected by individual unit differences can be also be evaluated.

In addition, the riding comfort as affected by differences in tires mounted on the vehicle can be evaluated. In addition, the riding comfort as affected by characteristics of the suspension installed into the vehicle can be evaluated. In addition, the riding comfort as affected by differences in vehicle seats, seat cushion angles, seat positions such as a rear angle of a seat back, and sitting postures can be evaluated.

In addition, the riding comfort as affected by differences in seated positions, such as the driver seat, passenger seat, and back seats (left, center, right) of a passenger car can be evaluated.

In addition, passenger seat riding comfort as affected by differences in the driver can be evaluated for passenger vehicles such as in taxis and buses. In this case, the present invention can be applied to evaluations of driving skills of the drivers of the passenger vehicles.

In addition, passenger seat riding comfort can be evaluated for vehicles such as railway cars, new transport systems and the like that travel on fixed tracks. In this case, the riding comfort as affected by differences in vehicle properties, tracks, and drive control can be evaluated.

In the first and second embodiments described above, the sternocleidomastoid muscles were selected beforehand as the skeletal muscles to be measured when evaluating the sense of lateral oscillation for a vehicle, and the myoelectric potentials of the sternocleidomastoid muscles were measured. However, the first and second embodiments can also include a selection step wherein the skeletal muscles to be measured are selected from the plurality of skeletal muscles involved in maintaining the posture of the head of the occupant when evaluating the sense of lateral oscillation of the vehicle. The myoelectric sensors can be attached to the selected skeletal muscles in order to evaluate the sense of lateral oscillation for the vehicle as described above.

The skeletal muscles selected in the selection step are at least one type of muscle selected from the group consisting of the sternocleidomastoid muscles, the upper trapezius muscles, the temporal muscles, and the splenius capitis muscles.

The foregoing essentially describes the present invention. The vehicle evaluation method and vehicle evaluation apparatus of the present invention were described in detail above. However, it should be understood that the present invention is not limited to the above embodiments, but may be improved or modified in various ways so long as they remain within the scope of the present invention.

EXAMPLE 1

An example of an evaluation method for a sense of lateral oscillation of a vehicle according to the present invention is described below in detail.

In the present example, at the same time that a linear travel test was performed under various conditions described below, muscle activity of left and right sternocleidomastoid muscles were measured, and an amount of simultaneous activity was calculated, a sensory evaluation of the sense of lateral oscillation was also conducted.

The linear travel test was performed at a speed of 60 km/h. The road condition was a paved, irregular road surface. The irregular road surface contained waves and other irregularities.

In the present example, a passenger vehicle was used as a test vehicle, and a tire pressure was one of three levels, namely specification A through specification C as shown below.

The passenger vehicle had a displacement of 3.5 L, and was a FR (rear wheel drive) four-door sedan. The tire size was 225/45R17.

Specification A had a tire pressure of 150 kPa on the front and 150 kPa on the rear.

Specification B had a tire pressure of 220 kPa on the front and 220 kPa on the rear.

Specification C had a tire pressure of 300 kPa on the front and 300 kPa on the rear.

In the present example, the amount of simultaneous activity was calculated as described below.

To calculate the amount of simultaneous activity, 5 test drivers specializing in sensory evaluations of riding comfort and vehicle handling properties (hereinafter referred to simply as test drivers) and 20 normal adult males with driver's licenses were made to ride as passengers in the various test vehicles of Specification A through Specification C. In the linear travel test, the muscle activity of the left and right sternocleidomastoid muscles of the 5 test drivers and the normal adult males was measured using the evaluation apparatus 10 described above.

The amount of simultaneous activity for the 5 test drivers and the 20 normal adult males was calculated using the mathematical formula 2.

Figure 9A:
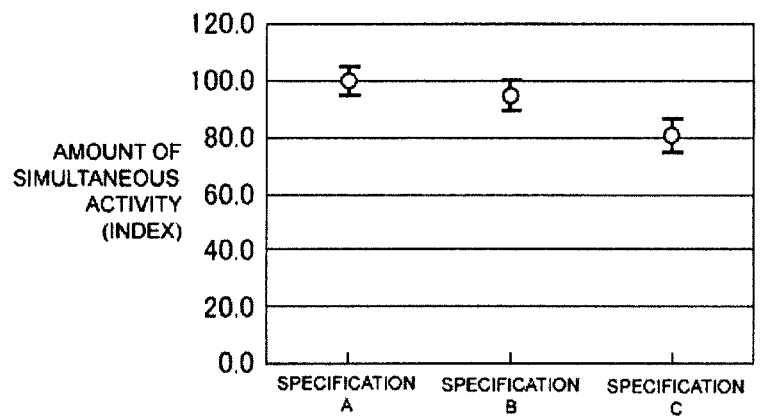
FIG. 9A is a graph showing results for the amount of simultaneous activity for five test drivers. The amount of simultaneous activity is shown on the vertical axis, and Specification A, Specification B, and Specification C are shown on the horizontal axis.
Figure 10A:
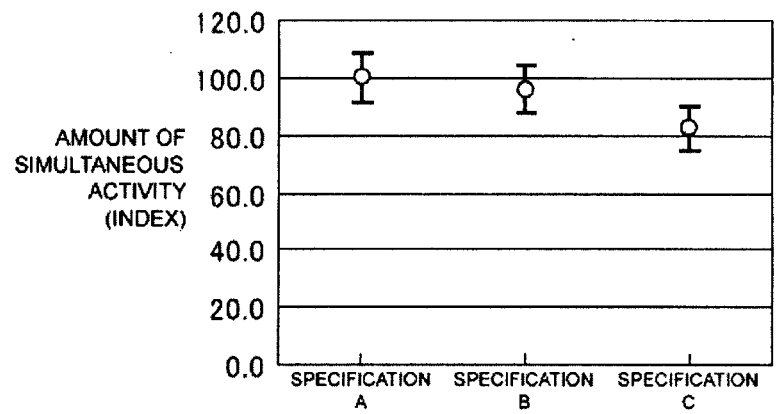
FIG. 10A is a graph showing results for the amount of simultaneous activity for twenty normal adult males. The amount of simultaneous activity is shown on the vertical axis, and Specification A, Specification B, and Specification C are shown on the horizontal axis.

Results for the amount of simultaneous activity for the 5 test drivers is shown in FIG. 9A, and results for the amount of simultaneous activity for the 20 normal adult males is shown in FIG. 10A.

FIG. 9A shows the amount of simultaneous activity for the test drivers expressed as indexes with a maximum value of 100.0.

FIG. 10A shows the amount of simultaneous activity for the normal adult males expressed as indexes with a maximum value of 100.0.

A sensory evaluation of the sense of lateral oscillation was also performed as described below.

In the sensory evaluation for the sense of lateral oscillation, the favorability of the sense of lateral oscillation in a linear travel test using the various test vehicles was evaluated based on evaluation criteria shown in Table 1 below using 5 test drivers and 20 normal adult males who were made to ride as passengers in the test vehicles of the aforementioned Specification A through Specification C while the muscle activity of their left and right sternocleidomastoid muscles was measured.

Figure 9B:
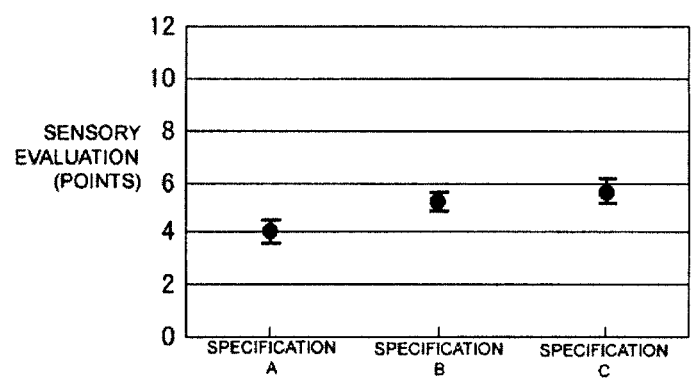
FIG. 9B is a graph showing results for sensory evaluations for five test drivers. The sensory evaluations (scores) are shown on the vertical axis and Specification A, Specification B, and Specification C are shown on the horizontal axis.
Figure 10B:
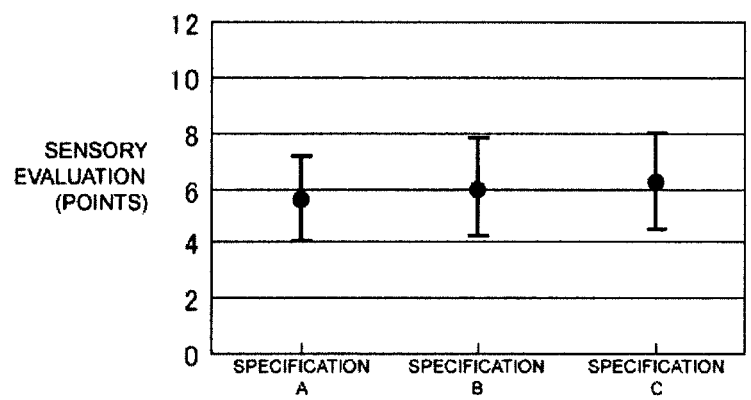
FIG. 10B is a graph showing results for sensory evaluations for twenty normal adult males. The sensory evaluations (scores) are shown on the vertical axis and Specification A, Specification B, and Specification C are shown on the horizontal axis.

Evaluation results for the sense of lateral oscillation for the 5 test drivers are shown in FIG. 9B, and evaluation results for the sense of lateral oscillation for the 20 normal adult males are shown in FIG. 10B.

The measurements for the muscle activity of the left and right sternocleidomastoid muscles and the sensory evaluations for the sense of lateral oscillation by the 5 test drivers and the 20 normal adult males were performed by the same drivers driving the test vehicles of Specification A through Specification C. That is, in the present example, one driver was used for measuring muscle activity and for performing a sensory evaluation of the sense of lateral oscillation.

TABLE 1

| Inferior | Extremely | 0 |
| --- | --- | --- |
|  | Very | 1 |
|  | Normal | 2 |
|  | Fairly | 3 |
|  | Slightly | 4 |
| No Preference |  | 5 |
| Superior | Slightly | 6 |
|  | Fairly | 7 |
|  | Normal | 8 |
|  | Very | 9 |
|  | Extremely | 10 |

As shown in FIG. 9A, the amount of simultaneous activity for the test drivers decreases in order of Specification A, Specification B, and Specification C. Therefore, evaluations of the sense of lateral oscillation based on the amount of simultaneous activity are more favorable in the order of Specification A, Specification B, and Specification C.

In addition, as shown in FIG. 9B, the sensory evaluation scores increased in order of Specification A, Specification B, and Specification C. Therefore, evaluations for the sense of lateral oscillation based on the sensory evaluation are more favorable in order of Specification A, Specification B, and Specification C.

In this manner, for the test drivers, the results for the amount of simultaneous activity shown in FIG. 9A match the results of the sensory evaluation shown in FIG. 9B.

Meanwhile, as shown in FIG. 10A, the amount of simultaneous activity for the normal adult males decreased in order of Specification A, Specification B, and Specification C. Therefore, evaluations of the sense of lateral oscillation based on the amount of simultaneous activity are more favorable in the order of Specification A, Specification B, and Specification C.

In addition, as shown in FIG. 10B, the sensory evaluation scores increased in order of Specification A, Specification B, and Specification C. However, the differences between Specification A through Specification C were minor, and the values for Specification B and Specification C were almost identical when variability was taken into account. Therefore, an evaluation of the sense of lateral oscillation based on a sensory evaluation of Specification A, Specification B, and Specification C could not be performed well by the normal adult males.

A comparison of the test drivers and the normal adult males shows that the normal adult males could not properly evaluate the sense of lateral oscillation based on sensory evaluations of Specification A, Specification B, and Specification C.

However, the differences between the test drivers and the normal adult males for the amounts of simultaneous activity was less than for the sensory evaluations. Therefore, even normal adult males can evaluate the sense of lateral oscillation in the same manner as a test driver using the amount of simultaneous activity of the present invention.

EXAMPLE 2

In the present example, at the same time that a turning travel test was performed under various conditions described below, the muscle activity of the left and right sternocleidomastoid muscles was measured, and the amplitude characteristic value for the side to the outside of the turning direction was calculated, a sensory evaluation of the sense of lateral oscillation was also conducted.

The turning travel test was performed on a course with a curvature radius of 140 m at a speed of 60 km/h. The road condition was a paved, irregular road surface. The irregular road surface contained waves and other irregularities.

In the present example, a passenger vehicle was used as a test vehicle, and the tire pressure was one of three levels, namely specification D through specification F as shown below.

The passenger vehicle had a displacement of 3.5 L, and was a FR (rear-wheel drive) four-door sedan. The tire size was 225/45R17.

Specification D had a tire pressure of 150 kPa on the front and 150 kPa on the rear.

Specification E had a tire pressure of 220 kPa on the front and 220 kPa on the rear.

Specification F had a tire pressure of 300 kPa on the front and 300 kPa on the rear.

In the present example, the amplitude characteristic value was determined as described below.

To determine the amplitude characteristic value, 5 test drivers specializing in sensory evaluations of riding comfort and vehicle handling properties (hereinafter referred to simply as test drivers) and 20 normal adult males with driver's licenses were made to ride as passengers in the various test vehicles of Specification D through Specification F. In the linear travel test, the muscle activity of the left and right sternocleidomastoid muscles of the 5 test drivers and the normal adult males were measured using the measuring apparatus 10 described above.

The amplitude characteristic value was calculated for the 5 test drivers and the 20 normal adult males. In the present example, the RMS value was calculated as a value expressing the amplitude for the amplitude characteristic value, and the standard deviation was calculated as a value expressing change in amplitude. In the present example, the amplitude characteristic value is expressed by the sum of the RMS value and the standard deviation.

The RMS value and the standard deviation were calculated using the smoothed myoelectric waveform data of the sternocleidomastoid muscle 110 on the outside of the turning direction in a region D representing turning as shown below in FIG. 11A through FIG. 11F.

In the present example, steering angles, yaw rates, and lateral accelerations were also measured. An example of the measurement results for the present example are shown in FIG. 11A through FIG. 11F. FIG. 11A through FIG. 11F show region D representing turning.

Figure 11A:
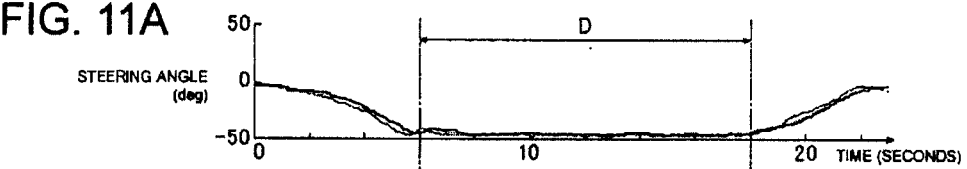
FIG. 11A through FIG. 11F are graphs showing an example of measurement results for Example 2.
Figure 11B:
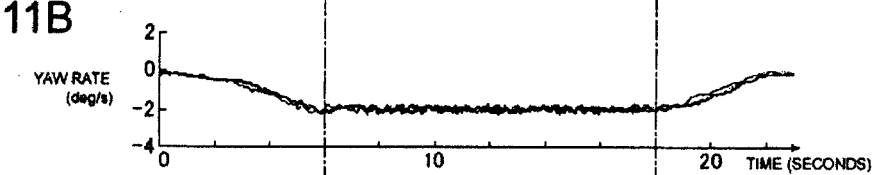
Figure 11C:
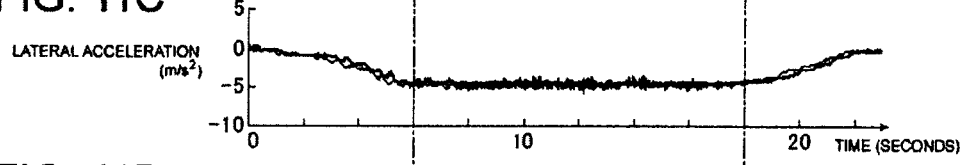
Figure 11D:
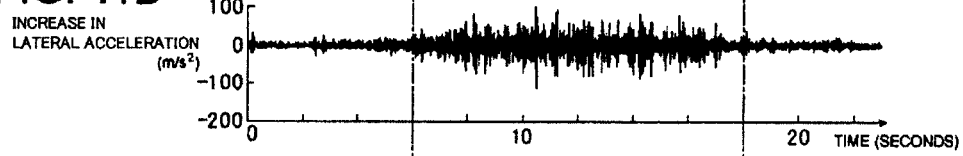
Figure 11E:
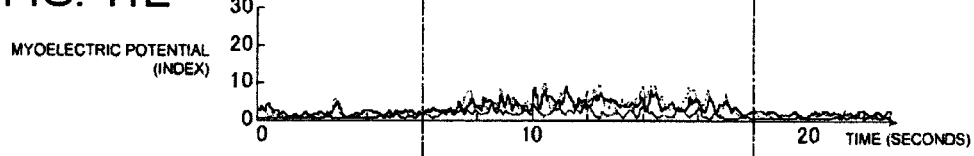
Figure 11F:

FIG. 11D also shows an increase in lateral acceleration obtained by the derivative over time of the lateral acceleration obtained in FIG. 11C. The increase in the lateral acceleration shown in FIG. 11D is used as an indicator of lateral oscillation. However, the RMS value of the increase in the lateral acceleration during turning showed almost no difference between Specification D through Specification F.

Figure 12A:
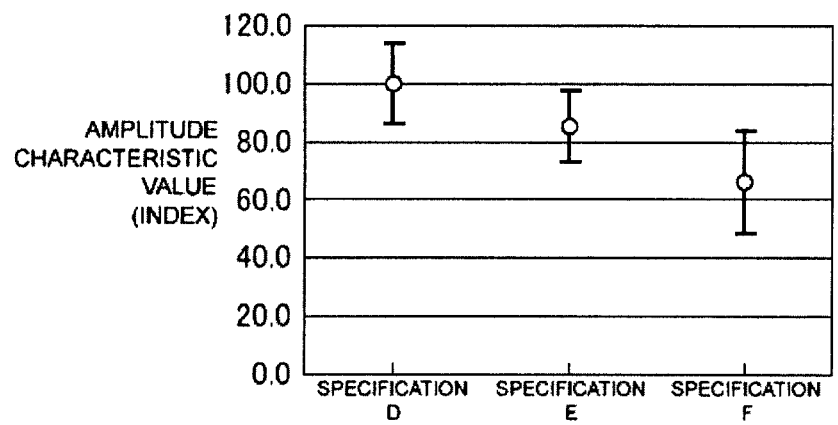
FIG. 12A is a graph showing results of amplitude characteristic values for five test drivers. The amplitude characteristic values are shown on the vertical axis, and Specification D, Specification E, and Specification F are shown on the horizontal axis.
Figure 13A:
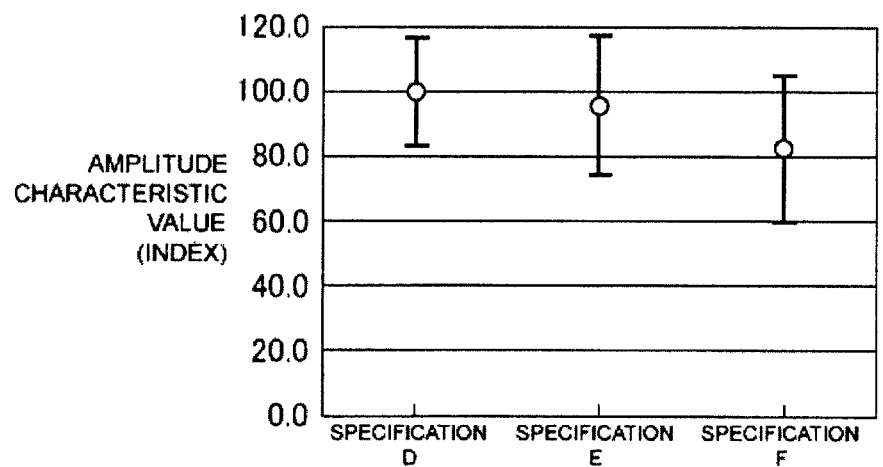
FIG. 13A is a graph showing results of amplitude characteristic values for twenty normal adult males. The amplitude characteristic values are shown on the vertical axis, and Specification D, Specification E, and Specification F are shown on the horizontal axis.

The results for the amplitude characteristic values of the 5 test drivers are shown in FIG. 12A, and the results for the amplitude characteristic values of the 20 normal adult males are shown in FIG. 13A.

In FIG. 12A, the amplitude characteristic values (the sum of the RMS value and the standard deviation) for the test drivers are expressed as an index with a maximum value of 100.0.

In FIG. 13A, the amplitude characteristic values (the sum of the RMS value and the standard deviation) for the normal adult males is expressed as an index with a maximum value of 100.0.

A sensory evaluation of the sense of lateral oscillation was also performed as described below.

In the sensory evaluation for the sense of lateral oscillation, favorability of the sense of lateral oscillation in a linear travel test using the various test vehicles was evaluated, as in the first example above, based on the evaluation criteria shown in Table 1 below using 5 test drivers and 20 normal adult males who were made to ride as passengers in the test vehicles of the aforementioned Specification D through Specification F while the muscle activity of their left and right sternocleidomastoid muscles was measured.

Figure 12B:
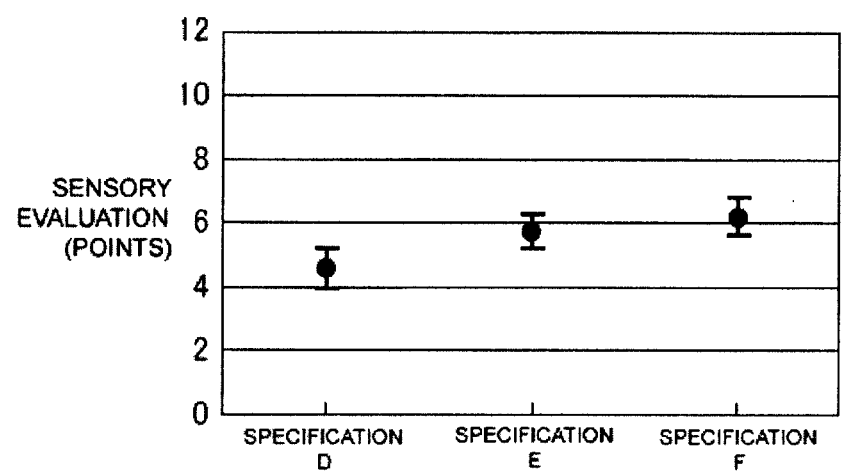
FIG. 12B is a graph showing results of sensory evaluations for five test drivers. The sensory evaluations (scores) are shown on the vertical axis and Specification D, Specification E, and Specification F are shown on the horizontal axis.
Figure 13B:
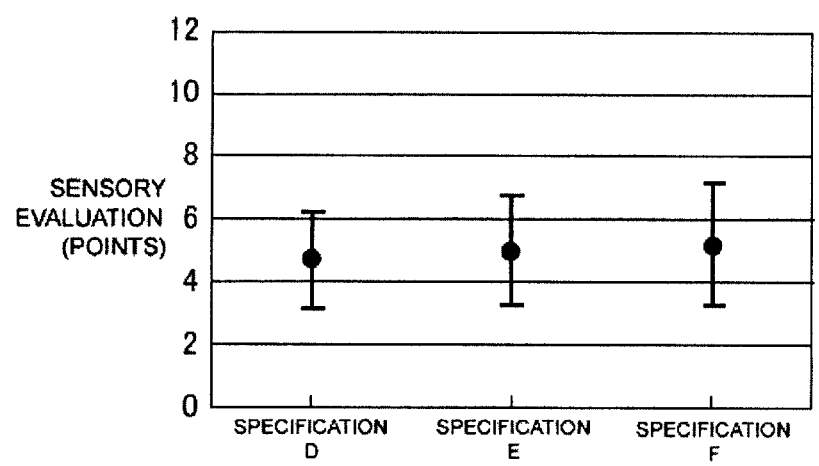
FIG. 13B is a graph showing results of sensory evaluation for twenty normal adult males. The sensory evaluations (scores) are shown on the vertical axis and Specification D, Specification E, and Specification F are shown on the horizontal axis.

Evaluation results for the sense of lateral oscillation for the 5 test drivers are shown in FIG. 12B, and evaluation results for the sense of lateral oscillation for the 20 normal adult males are shown in FIG. 13B.

The measurements for the muscle activity of the left and right sternocleidomastoid muscles and the sensory evaluations for the sense of lateral oscillation by the 5 test drivers and the 20 normal adult males were performed with the same driver driving the test vehicles of Specification through Specification F. That is, in the present example, one driver was used for measuring muscle activity and for performing sensory evaluation of the sense of lateral oscillation.

As shown in FIG. 12A, the amplitude characteristic values for the test drivers decrease in order of Specification D, Specification E, and Specification F. Therefore, the evaluation for the sense of lateral oscillation based on the amplitude characteristic value is preferably in order of Specification D, Specification E, and Specification F.

Furthermore, as shown in FIG. 12B, the sensory evaluation scores increased in order of Specification D, Specification E, and Specification F. Therefore, evaluations for the sense of lateral oscillation based on the sensory evaluation are more favorable in order of Specification D, Specification E, and Specification F.

In this manner, for the test drivers, the results for the amplitude characteristic values shown in FIG. 12A match the results of the sensory evaluations shown in FIG. 12B.

Meanwhile, as shown in FIG. 13A, the amplitude characteristic values for the normal adult males decreased in order of Specification D, Specification E, and Specification F. Therefore, the evaluations for the sense of lateral oscillation based on the amplitude characteristic value is preferably in order of Specification D, Specification E, and Specification F.

Furthermore, as shown in FIG. 13B, the sensory evaluation scores increased in order of Specification D, Specification E, and Specification F. However, the differences between Specification D through Specification F were minor, and the values for Specification E and Specification F were almost identical when variability was taken into account. Therefore, an evaluation of the sense of lateral oscillation based on a sensory evaluation of Specification D, Specification E, and Specification F could not be performed well by the normal adult males.

A comparison of the test drivers and the normal adult males shows that the normal adult males could not properly evaluate the sense of lateral oscillation based on sensory evaluations of Specification D, Specification E, and Specification F.

However, the differences between the test drivers and the normal adult males for the amplitude characteristic value was less than for the sensory evaluations. Therefore, even normal adult males can evaluate the sense of lateral oscillation in the same manner as a test driver using the amplitude characteristic value of the present invention.

What is claimed is:

1. A vehicle evaluation method for evaluating a sense of lateral oscillation that expresses riding comfort of a vehicle using at least one type of skeletal muscle involved in maintaining posture of a head of an occupant of the vehicle, comprising:
   a measuring step of measuring muscle activity waveforms of a pair of left and right muscles of at least one type of skeletal muscle involved in maintaining posture of the head of the occupant of the vehicle being driven under predetermined driving conditions using a measuring unit;
   a calculating step of calculating an amount of simultaneous activity that expresses characteristics of the muscle activity waveforms measured in the measuring step using a processor; and
   an evaluating step of evaluating the sense of lateral oscillation of the vehicle using an evaluation unit based on the amount of simultaneous activity calculated in the calculating step and further based on consideration that the sense of lateral oscillation becomes greater as the amount of simultaneous activity increases;
   wherein the at least one type of skeletal muscle is at least one type of muscle selected from the group consisting of sternocleidomastoid muscles, upper trapezius muscles, temporal muscles, and splenius capitis muscles; and
   wherein a myolectric potential of the muscle activity measured in the measuring step is normalized using an amount of muscle activity of the at least one type of skeletal muscle where a weight of the head itself of the occupant is a load determined by holding the head off the ground in a lateral recumbent position.

2. The vehicle evaluation method according to claim 1, further comprising:
   a first determination step, prior to the evaluating step, of determining whether or not the vehicle is in a state of substantially linear travel using the processor,
   wherein if the first determination step determines that the vehicle is in a state of substantially linear travel, the evaluating step evaluates the sense of lateral oscillation of the vehicle.

3. The vehicle evaluation method according to claim 2, wherein the first determination step determines a difference in a trend component in the muscle activity of the pair of left and right skeletal muscles, and determines that the vehicle is in the state of substantially linear travel if the difference is within a predetermined range.

4. The vehicle evaluation method according to claim 1, further comprising:
a second determination step, prior to the evaluating step, of determining whether or not a forward or reverse speed of the vehicle is substantially constant using the processor, wherein if the second determination step determines that the forward or reverse speed of the vehicle is substantially constant, the evaluating step evaluates the sense of lateral oscillation of the vehicle.

5. The vehicle evaluation method according to claim 1, further comprising a selection step, prior to the measuring step, of selecting the at least one type of skeletal muscle from a plurality of skeletal muscles involved in maintaining the posture of the head of the occupant using the processor.

6. The vehicle evaluation method according to claim 5, wherein the at least one type of skeletal muscle selected by the selection step is at least one type of muscle selected from the group consisting of sternocleidomastoid muscles, upper trapezius muscles, temporal muscles, and splenius capitis muscles.

7. The vehicle evaluation method according to claim 1, further comprising using a rate gyroscope or angular velocity meter to determine a traveling state of the vehicle.

8. The vehicle evaluation method according to claim 1, further comprising using a gyroscopic sensor to measure a roll angle of the vehicle.

9. The vehicle evaluation method according to claim 1, further comprising using a steering angle meter having a rotary encoder to measure a steering angle of the vehicle.

10. The vehicle evaluation method according to claim 1, further comprising using a GPS device to measure GPS-based vehicle position information in order to determine a traveling state of the vehicle.

11. The vehicle evaluation method according to claim 1, further comprising determining a traveling state of the vehicle by measuring the myoelectric potential of the at least one type of skeletal muscle.

12. The vehicle evaluation method according to claim 1, further comprising determining a traveling state of the vehicle by measuring a muscle murmur.

13. The vehicle evaluation method according to claim 1, further comprising normalizing the myoelectric potential of the muscle activity prior to the measuring step using the weight of the head as a baseline value for reference voluntary electric activity.

14. The vehicle evaluation method according to claim 1, wherein the amount of simultaneous activity is an average value or a geometric mean value of root-mean-square value of the muscle activity waveforms of the pair of left and right muscles.

15. A vehicle evaluation apparatus for evaluating a sense of lateral oscillation that expresses riding comfort of a vehicle using at least one type of skeletal muscle involved in maintaining posture of a head of an occupant of the vehicle, comprising:
a muscle activity measuring unit for measuring muscle activity waveforms of a pair of left and right muscles of the at least one type of skeletal muscle involved in maintaining posture of the head of the occupant of the vehicle being driven under predetermined driving conditions;
an analysis unit for calculating an amount of simultaneous activity that expresses characteristics of the muscle activity waveforms measured by the muscle activity measuring unit; and
an evaluating unit that evaluates the sense of lateral oscillation of the vehicle based on the amount of simultaneous activity calculated by the analysis unit and further based on consideration that the sense of lateral oscillation becomes greater as the amount of simultaneous activity increases;
wherein the at least one type of skeletal muscle is at least one type of muscle selected from the group consisting of sternocleidomastoid muscles, upper trapezius muscles, temporal muscles, and splenius capitis muscles; and
wherein a myoelectric potential of the muscle activity measured in the measuring step is normalized using an amount of muscle activity of the at least one type of skeletal muscle where a weight of the head itself of the occupant is a load determined by holding the head off the ground in a lateral recumbent position.

16. The vehicle evaluation apparatus according to claim 15, wherein the amount of simultaneous activity is an average value or a geometric mean value of root-mean-square value of the muscle activity waveforms of the pair of left and right muscles.

17. A vehicle riding comfort evaluation method for evaluating a sense of lateral oscillation that expresses riding comfort of a vehicle using at least one type of skeletal muscle involved in maintaining posture of a head of an occupant of the vehicle, comprising the steps of:
a measuring step of measuring a muscle activity waveform of a muscle on a side opposite to a turning direction in the at least one type of skeletal muscle involved in maintaining posture of the head of the occupant in the vehicle while turning using a measuring unit, wherein the at least one type of skeletal muscle is at least one type of muscle selected from the group consisting of sternocleidomastoid muscles, upper trapezius muscles, temporal muscles, and splenius capitis muscles;
a determination step, prior to the measuring step, of determining whether or not a traveling vehicle is turning and a turning direction using the processor;
a selection step of selecting the muscle on the side opposite to the turning direction determined in the determination step in the at least one type of skeletal muscle among a plurality of skeletal muscles involved in maintaining the posture of the head of the occupant of the vehicle using the processor when the determination step determines that a traveling state of the vehicle is a turning state and the turning direction is identified;
a calculating step of calculating an amplitude characteristic value of a myoelectric potential that expresses characteristics of the muscle activity waveform of the muscle on a side opposite to a turning direction measured in the measurement step using a processor; and
an evaluating step of evaluating a sense of lateral oscillation of the vehicle based on the amplitude characteristic value of the muscle on the side opposite to a turning direction calculated in the calculation step using an evaluation unit and further based on consideration that the sense of lateral oscillation becomes greater as the amount of the amplitude characteristic value increases for the muscle on a side opposite to a turning direction;
wherein the at least one type of skeletal muscle is at least one type of muscle selected from the group consisting of sternocleidomastoid muscles, upper trapezius muscles, temporal muscles, and splenius capitis muscles; and
wherein a myoelectric potential of the muscle activity measured in the measuring step is normalized using an amount of muscle activity of the at least one type of skeletal muscle where a weight of the head itself of the occupant is a load determined by holding the head off the ground in a lateral recumbent position.

18. The vehicle riding comfort evaluation method according to claim 17, wherein the determination step uses the processor to calculates a difference between the amounts of muscle activity of the left and right muscles of the at least one type of skeletal muscle of which the muscle activity waveforms are measured, and determines whether or not the vehicle is turning and the turning direction based on the difference.

19. The vehicle evaluation method according to claim 17, wherein the amplitude characteristic value is represented by an amplitude and a change in the amplitude of the myoelectric potential, the amplitude is a root-mean-square value of the myoelectric potential, and the change in the amplitude is a standard deviation or a value obtained by dividing the standard deviation by an average value for a predetermined range of the muscle activity waveforms.

20. A vehicle riding comfort evaluation apparatus for evaluating a sense of lateral oscillation that expresses riding comfort of a vehicle using at least one type of skeletal muscle involved in maintaining posture of a head of an occupant of the vehicle, comprising:
a muscle activity measuring unit for measuring a muscle activity waveform of a muscle on a side opposite to a turning direction in at least one type of skeletal muscle involved in maintaining posture of a head of an occupant in a vehicle while turning;
a determination unit for determining, prior to the measuring of the muscle activity waveform by the muscle activity measuring unit, whether or not a traveling vehicle is turning and a turning direction thereof;
a selecting unit for selecting the muscle on the side opposite to the turning direction determined by the determination unit in the at least one type of skeletal muscle among a plurality of skeletal muscles involved in maintaining the posture of the head of the occupant of the vehicle when the determination unit determines that the traveling vehicle is in a state of turning and the turning direction is identified;
an analysis unit for calculating an amplitude characteristic value of muscle activity that expresses characteristics of the muscle activity waveform of the muscle on a side opposite to a turning direction measured by the muscle activity measuring unit; and
an evaluating unit for evaluating a sense of lateral oscillation of the vehicle based on the amplitude characteristic value calculated by the analysis unit and further based on consideration that the sense of lateral oscillation becomes greater as the amount of the amplitude characteristic value increases for the muscle on a side opposite to a turning direction;
wherein the at least one type of skeletal muscle is at least one type of muscle selected from the group consisting of sternocleidomastoid muscles, upper trapezius muscles, temporal muscles, and splenius capitis muscles; and
wherein a myolelectric potential of the muscle activity measured in the measuring step is normalized using an amount of muscle activity of the at least one type of skeletal muscle where a weight of the head itself of the occupant is a load determined by holding the head off the ground in a lateral recumbent position.

21. The vehicle evaluation apparatus according to claim 20, wherein the amplitude characteristic value is represented by an amplitude and a change in the amplitude of the myoelectric potential, the amplitude is a root-mean-square value of the myoelectric potential, and the change in the amplitude is a standard deviation or a value obtained by dividing the standard deviation by an average value for a predetermined range of the muscle activity waveforms.

* * * * *